(12) United States Patent
Suzuki et al.

(10) Patent No.: US 9,416,738 B2
(45) Date of Patent: Aug. 16, 2016

(54) INTERNAL COMBUSTION ENGINE CONTROL DEVICE FOR CARRYING OUT INJECTION AMOUNT FEEDBACK CONTROL

(75) Inventors: Yusuke Suzuki, Hadano (JP); Soichiro Tanaka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 750 days.

(21) Appl. No.: 13/640,600

(22) PCT Filed: May 10, 2010

(86) PCT No.: PCT/JP2010/057900
§ 371 (c)(1),
(2), (4) Date: Oct. 11, 2012

(87) PCT Pub. No.: WO2011/141989
PCT Pub. Date: Nov. 17, 2011

(65) Prior Publication Data
US 2013/0046451 A1    Feb. 21, 2013

(51) Int. Cl.
*F02D 35/02* (2006.01)
*F02D 41/00* (2006.01)
(Continued)

(52) U.S. Cl.
CPC ............ *F02D 35/023* (2013.01); *F02D 19/084* (2013.01); *F02D 35/028* (2013.01);
(Continued)

(58) Field of Classification Search
CPC ............ F02B 2075/125; F02B 23/101; F02D 19/0689; F02D 19/084; F02D 2200/021; F02D 2200/0402; F02D 2200/0612; F02D 35/023; F02D 35/028; F02D 37/02; F02D 41/0025; F02D 41/0062; F02D 41/0072

USPC ........ 701/102, 103, 104, 105, 108, 109, 111; 123/90.15, 299, 300, 304, 305, 406.22, 123/406.26, 406.27, 406.41, 435; 73/114.16, 114.17, FOR. 114, FOR. 116
See application file for complete search history.

(56) References Cited

U.S. PATENT DOCUMENTS 5,474,045 A * 12/1995 Demizu et al. ........... 123/406.47
6,041,591 A *  3/2000 Kaneko et al. ............... 60/274
(Continued)

FOREIGN PATENT DOCUMENTS

JP     62-228642 A    10/1987
JP      9-291825 A    11/1997
(Continued)

OTHER PUBLICATIONS

International Search Report for PCT/JP2010/057900 dated Jun. 8, 2010.

*Primary Examiner* — Erick Solis
*Assistant Examiner* — Carl Staubach
(74) *Attorney, Agent, or Firm* — Sughrue Mion, PLLC

(57) ABSTRACT

A control device for an internal combustion engine is provided, which can carry out favorable injection amount feedback control even when a fuel property changes. A cylinder internal pressure sensor (16) that detects a cylinder internal pressure is included. A cylinder internal fresh air amount is calculated based on the cylinder internal pressure detected by the cylinder internal pressure sensor (16) (100). Based on the cylinder internal pressure detected by the cylinder internal pressure sensor (16), an actual heating value is calculated (120). From the calculated cylinder internal fresh air amount, a target heating value in a predetermined excess air ratio is calculated (150). A comparison value of the actual heating value and the target heating value is fed back to a fuel injection amount so that the calculated actual heating value corresponds to the target heating value (160, 170).

16 Claims, 21 Drawing Sheets

(51) Int. Cl.
*F02D 19/08* (2006.01)
*F02D 41/18* (2006.01)
*F02B 23/10* (2006.01)
*F02B 75/12* (2006.01)
*F02D 19/06* (2006.01)
*F02D 37/02* (2006.01)

(52) U.S. Cl.
CPC .......... *F02D41/0025* (2013.01); *F02D 41/182* (2013.01); *F02B 23/101* (2013.01); *F02B 2075/125* (2013.01); *F02D 19/0689* (2013.01); *F02D 37/02* (2013.01); *F02D 41/0062* (2013.01); *F02D 41/0072* (2013.01); *F02D 2200/021* (2013.01); *F02D 2200/0402* (2013.01); *F02D 2200/0612* (2013.01); *Y02T 10/123* (2013.01); *Y02T 10/36* (2013.01)

(56) References Cited

U.S. PATENT DOCUMENTS

| | | | |
|---|---|---|---|
| 7,159,568 B1* | 1/2007 | Lewis et al. | 123/431 |
| 7,529,613 B2* | 5/2009 | Sameshima et al. | 701/102 |
| 7,693,646 B2* | 4/2010 | Moriya | F02D 35/023 123/435 |
| 2005/0229903 A1* | 10/2005 | Kobayashi et al. | 123/435 |
| 2007/0084442 A1* | 4/2007 | Nakagawa et al. | 123/406.27 |
| 2008/0162017 A1* | 7/2008 | Nagata et al. | 701/103 |
| 2008/0167786 A1 | 7/2008 | Sasaki et al. | |
| 2008/0195294 A1 | 8/2008 | Moriya | |
| 2009/0093945 A1* | 4/2009 | Okumura | F02D 41/1494 701/103 |
| 2009/0210138 A1* | 8/2009 | Hokuto et al. | 701/103 |
| 2010/0049422 A1* | 2/2010 | Moriya | 701/103 |
| 2010/0089363 A1* | 4/2010 | Moriya | 123/435 |

FOREIGN PATENT DOCUMENTS

| | | |
|---|---|---|
| JP | 2000-265873 A | 9/2000 |
| JP | 2005-23850 A | 1/2005 |
| JP | 2005-207407 A | 8/2005 |
| JP | 2006-97588 A | 4/2006 |
| JP | 2006-144643 A | 6/2006 |
| JP | 2008-169717 A | 7/2008 |
| JP | 2009-13922 A | 1/2009 |
| JP | 2009-138556 A | 6/2009 |

* cited by examiner

INTERNAL COMBUSTION ENGINE CONTROL DEVICE FOR CARRYING OUT INJECTION AMOUNT FEEDBACK CONTROL

CROSS REFERENCE TO RELATED APPLICATIONS

This application is a National Stage of International Application No. PCT/JP2010/057900 filed May 10, 2010, the contents of which are incorporated herein by reference in their entirety.

TECHNICAL FIELD

The present invention relates to a control device for an internal combustion engine, and more particularly to a control device for an internal combustion engine that is suitable to execute control of the internal combustion engine which is loaded on a vehicle.

BACKGROUND ART

While the demands concerning fuel efficiency and emissions are growing, mounting a cylinder internal pressure sensor to grasp a combustion state attracts attention. However, a cylinder internal pressure sensor is high in cost, and therefore, in order to adopt a cylinder internal pressure sensor, reduction in cost, and an additional merit such as substitution for another sensor are required.

As disclosed in, for example, Patent Literature 1, an internal combustion engine including a cylinder internal sensor is known. Further, the publication discloses a method which detects a heating value from the output value of the cylinder internal pressure sensor, and calculates an air-fuel ratio from the detected heating value in order to substitute the cylinder internal pressure sensor for an air-fuel sensor. More specifically, the publication discloses calculating an air-fuel ratio from a heating value/an injection time in a rich region ("/" is division sign. The same thing also applies to the following description), and calculating the air-fuel ratio from the heating value/the air amount in a lean region. According to the method like this, injection amount feedback control which corrects a fuel injection amount can be carried out based on the difference of the calculated air-fuel ratio and a target air-fuel ratio so that the air-fuel ratio corresponds to a target air-fuel ratio.

CITATION LIST

Patent Literature

Patent Literature 1: Japanese Patent Laid-Open No. 2006-144643
Patent Literature 2: Japanese Patent Laid-Open No. 2005-23850
Patent Literature 3: Japanese Patent Laid-Open No. 2006-97588

SUMMARY OF INVENTION

Technical Problem

FIG. 21 is a diagram showing a relation of a heating value/an injection amount, and an excess air ratio λ for each ethanol concentration in a fuel. The heating value/the injection amount means a heat generation efficiency, and the injection amount is proportional to an injection time. As shown in FIG. 21, the heating value/the injection amount becomes lower toward a richer side. Therefore, in the above described conventional fuel injection amount feedback control based on an air-fuel ratio, when the heating value/the injection amount lowers, the air-fuel ratio is determined to become rich, and the fuel injection amount is reduced.

However, according to the above described conventional injection amount feedback control, the problem as follows arises. As shown in, for example, FIG. 21, as the ethanol concentration in the fuel increases (E85), the heating value/the injection amount (heat generation efficiency) becomes lower as compared with a gasoline fuel (E0). More specifically, the heating value/the injection amount is reduced when the ethanol concentration becomes high, even if the air-fuel ratio is not rich.

In the above described conventional injection amount feedback control, consideration is not given to the fact that the heating value/the injection amount (heat generation efficiency) changes in accordance with the fuel property such as an ethanol concentration. Therefore, when an ethanol mixture fuel with a concentration higher than a set value is supplied, the heating value/the injection amount lowers, and it is erroneously determined that the air-fuel ratio becomes rich. As a result, the fuel injection amount continues to be decreased by the injection amount feedback control, which leads to a lean misfire. In order to avoid the problem in the above described conventional internal combustion engine, an ethanol concentration sensor is additionally needed, and this makes increase in cost unavoidable.

The invention is made to solve the problem as described above, and an object of the present invention is to provide a control device for an internal combustion engine which can carry out favorable injection amount feedback control irrespective of the fuel properties.

Solution to Problem

A first aspect of the present invention is a control device for an internal combustion engine, comprising:

a cylinder internal pressure sensor that detects a cylinder internal pressure;

cylinder internal fresh air amount calculating means that calculates a cylinder internal fresh air amount based on the cylinder internal pressure detected by the cylinder internal pressure sensor;

actual heating value calculating means that calculates an actual heating value based on the cylinder internal pressure detected by the cylinder internal pressure sensor;

target heating value calculating means that calculates a target heating value in a predetermined excess air ratio from the cylinder internal fresh air amount calculated by the cylinder internal fresh air amount calculating means; and feedback means that feeds a comparison value of the actual heating value and the target heating value back to a fuel injection amount so that the actual heating value calculated by the actual heating value calculating means corresponds to the target heating value.

A second aspect of the present invention is the control device for an internal combustion engine according to the first aspect, wherein the actual heating value is a maximum value in a time period until an exhaust valve opens from start of combustion.

A third aspect of the present invention is the control device for an internal combustion engine according to the first or the second aspects, further comprising;

target excess air ratio setting means that sets a target excess air ratio based on an operation request; and correction means that corrects the target heating value based on a heating value ratio of a heating value in the predetermined excess air ratio, and a heating value in the target excess air ratio.

A fourth aspect of the present invention is the control device for an internal combustion engine according to any one of the first to the third aspects, further comprising:

water temperature detecting means that detects a water temperature; and correction means that corrects the target heating value by decreasing the target heating value as the water temperature detected by the water temperature detecting means decreases.

A fifth aspect of the present invention is the control device for an internal combustion engine according to any one of the first to the fourth aspects, further comprising:

target combustion point setting means that sets a target combustion point in which a combustion ratio becomes a predetermined ratio based on ignition timing; and correction means that corrects the target heating value based on a heating value ratio of a heating value in a combustion point (hereinafter described as an MBT combustion point) in which a combustion ratio at MBT becomes the predetermined ratio, and a heating value in the target combustion point.

A sixth aspect of the present invention is the control device for an internal combustion engine according to any one of the first to the fifth aspects, further comprising:

alcohol concentration acquiring means that acquires an alcohol concentration in a fuel based on a fuel injection amount required to obtain the actual heating value calculated by the actual heating value calculating means, and the actual heating value; and correction means that corrects the target heating value by decreasing the target heating value as the alcohol concentration acquired by the alcohol concentration acquiring means increases.

A seventh aspect of the present invention is the control device for an internal combustion engine according to any one of the first to the sixth aspects, further comprising:

EGR rate acquiring means that acquires an EGR rate; and correction means that corrects the target heating value by increasing the target heating value as the EGR rate acquired by the EGR rate acquiring means increases.

An eighth aspect of the present invention is the control device for an internal combustion engine according to any one of the first to the seventh aspects, further comprising:

target combustion point setting means that sets a target combustion point in which a combustion ratio becomes a predetermined ratio based on ignition timing;

actual combustion point calculating means that calculates an actual combustion point in which the combustion ratio in the ignition timing becomes the predetermined ratio; and actual heating value correcting means that corrects the actual heating value based on a difference of a heating value ratio of the target combustion point to an MBT combustion point, and a heating value ratio of the actual combustion point to an MBT combustion point.

Advantageous Effects of Invention

In the heating value ratio in a predetermined excess air ratio, a difference according to fuel properties is very small (FIG. 2). According to the first aspect, a comparison value of the actual heating value and the target heating value can be fed back to a fuel injection amount so that the actual heating value corresponds to the target heating value in the predetermined excess air ratio. By setting the target controlled variable as the heating value, injection amount feedback control with high robustness which hardly receives the influence of a fuel property can be performed.

According to the second aspect, a maximum value within a time period until an exhaust valve opens from start of combustion is an actual heating value. Therefore, according to the present invention, the actual heating value can be detected with high precision.

According to the third aspect, the target heating value is corrected based on a heating value ratio of a heating value in the predetermined excess air ratio, and a heating value in the target excess air ratio. Therefore, according to the present invention, the target heating value is corrected with higher precision, and the precision of the injection amount control adapted to the catalyst purification window can be enhanced. Further, if correction is made based on the heating value ratio, the influence of the operation conditions is not received, and therefore, the number of adaptation steps and the ROM capacity can be significantly reduced.

According to the fourth aspect, the target heating value is corrected by being decreased as the water temperature decreases. Therefore, according to the present invention, in response to the change amount of the heating value due to cooling loss, the target heating value is corrected with higher precision, and the precision of the injection amount control adapted to the catalyst purification window can be enhanced.

According to the fifth aspect, the target heating value is corrected based on a heating value ratio of a heating value in an MBT combustion point, and a heating value in the target combustion point. Therefore, according to the present invention, the target heating value is corrected with higher precision in response to the change amount of the heating value due to ignition timing, and the precision of the injection amount control adapted to the catalyst purification window can be enhanced. Further, if correction is made based on the heating value ratio, the influence of the operation conditions is not received, and therefore, the number of adaptation steps and the ROM capacity can be significantly reduced.

According to the sixth aspect, the target heating value is corrected by being decreased as the alcohol concentration increases. Therefore, according to the present invention, in response to the change amount of the heating value due to the alcohol concentration, the target heating value is corrected with higher precision, and the precision of the injection amount control adapted to the catalyst purification window can be enhanced.

According to the seventh aspect, the target heating value is corrected by being increased as the EGR rate increases. Therefore, according to the present invention, in response to the change amount of the heating value due to the EGR rate, the target heating value is corrected with higher precision, and the precision of the injection amount control adapted to the catalyst purification window can be enhanced.

According to the eighth aspect, the actual heating value is corrected based on a difference of a heating value ratio of the target combustion point to the MBT combustion point, and a heating value ratio of the actual combustion point to the MBT combustion point. Therefore, according to the present invention, in response to the change amount of the heating value due to a control error, the actual heating value is corrected with high precision, and the precision of the injection amount control adapted to the catalyst purification window can be enhanced.

REFERENCE SIGNS LIST

Figure 1:
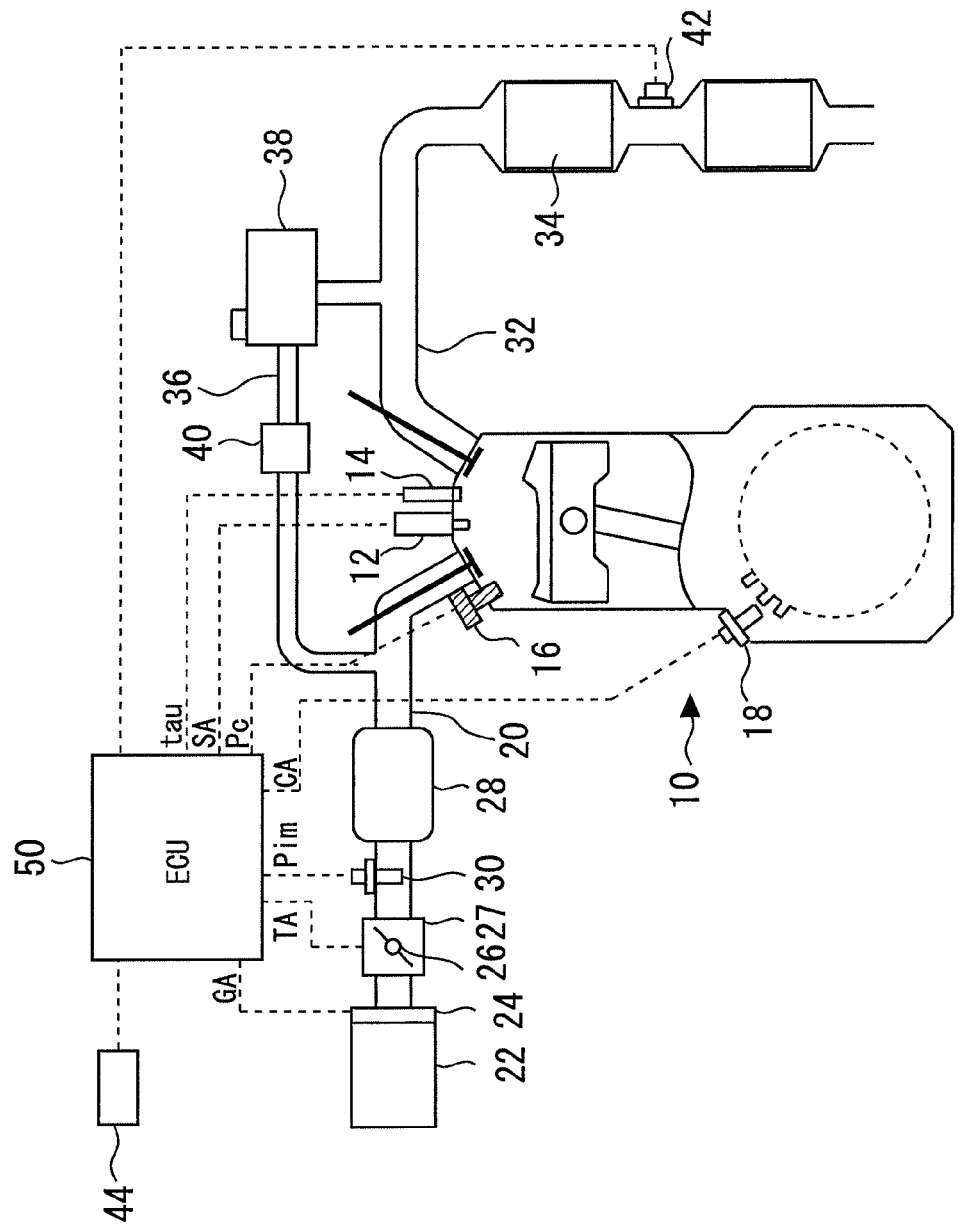
FIG. 1 is a schematic configuration for explaining a system configuration of embodiment 1 of the present invention.

Qd actual heating value
Qt ideal heating value
qb basic injection amount
qh injection amount correction amount
α threshold value
λ excess air ratio
10 internal combustion engine
12 spark plug
14 injector
16 cylinder internal pressure sensor
18 crank angle sensor
24 air flow meter
26 throttle valve
27 throttle opening sensor
30 intake pressure sensor
34 catalyst
36 EGR passage
42 sub O2 sensor
44 water temperature sensor
50 ECU (Electronic Control Unit)

DESCRIPTION OF EMBODIMENTS

Hereinafter, embodiments of the present invention will be described in detail with reference to the drawings. The common elements in the respective drawings are assigned with the same reference signs and the redundant description will be omitted.

Embodiment 1

[System Configuration of Embodiment 1]

FIG. 1 is a schematic configuration for explaining a system configuration of embodiment 1 of the present invention. The system shown in FIG. 1 includes an internal combustion engine (Hereinafter, simply called an engine.) 10. The engine 10 shown in FIG. 1 is a spark ignition type four-stroke reciprocating engine including a spark plug 12. Further, the engine 10 is also a cylinder direct injection engine including an injector 14 which directly injects a fuel into a cylinder. As the fuel, gasoline and an alcohol (for example, ethanol) blended fuel are used.

FIG. 1 shows only one cylinder, but the engine 10 for a vehicle is generally configured by a plurality of cylinders. Each of the cylinders is mounted with a cylinder internal pressure sensor 16 for detecting a cylinder internal pressure. Further, the engine 10 is mounted with a crank angle sensor 18 which outputs a signal CA in response to a rotation angle of a crankshaft.

An intake system of the engine 10 is provided with an intake passage 20 which is connected to each of the cylinders. An air cleaner 22 is provided at an inlet of the intake passage 20. An air flow meter 24 which outputs a signal GA corresponding to a flow rate of air which is taken into the intake passage 20 is mounted downstream of the air cleaner 22. An electronically controlled throttle valve 26 is provided downstream of the air flow meter 24. A throttle opening sensor 27 which outputs a signal TA corresponding to an opening of the throttle valve 26 is mounted in a vicinity of the throttle valve 26. A surge tank 28 is provided downstream of the throttle valve 26. An intake pressure sensor 30 for measuring an intake pressure is mounted in a vicinity of the surge tank 28.

In an exhaust system of the engine 10, an exhaust passage 32 which is connected to each of the cylinders is provided. A catalyst 34 is provided in the exhaust passage 32. As the catalyst, for example, a three way catalyst, an NOx catalyst and the like are used. Further, at the exhaust passage 32, an EGR passage 36 which is connected to the intake passage 20 is provided. In the EGR passage 36, an EGR cooler 38 and an EGR valve 40 are provided.

An ECU (Electronic Control Unit) 50 is provided at a control system of the engine 10. Various sensors such as the cylinder internal pressure sensor 16, the crank angle sensor 18, the air flow meter 24, the throttle opening sensor 27, and the intake pressure sensor 30 which are described above are connected to an input section of the ECU 50. Further, various actuators such as the spark plug 12, the injector 14, the throttle valve 26, and the EGR valve 40 which are described above are connected to an output section of the ECU 50. The ECU 50 controls an operation state of the engine 10 based on various kinds of information which are inputted. Further, the ECU 50 can calculate an engine speed NE (rotational frequency per unit time) and a cylinder internal volume V which is determined by the position of a piston from the signal CA of the crank angle sensor 18.

[Characteristic Control in Embodiment 1]

In the system configuration described above, in order to keep emission and the like favorable, injection amount feedback control (PID control) is desired to be carried out. However, in the system described above, an air-fuel ratio sensor is not mounted upstream of the catalyst 34 for the purpose of cost reduction. Therefore, it is considered to calculate an air-fuel ratio from the heating value detected from the output value of the cylinder internal pressure sensor, and feed a correction amount corresponding to a difference between the air-fuel ratio and a theoretical air-fuel ratio back to the fuel injection amount in order to make the air-fuel ratio to correspond to the theoretical air-fuel ratio in order to substitute for an air-fuel ratio sensor, as disclosed in, for example, Japanese Patent Laid-Open No. 2006-144643.

However, whereas an excess air ratio λ (an air-fuel ratio/a theoretical air-fuel ratio) is detected from the air-fuel ratio sensor, it is only an air-fuel ratio that is calculated based on the output value of the cylinder internal pressure sensor. Therefore, under the conditions in which the theoretical air-fuel ratio changes because the fuels with different ethanol concentrations are supplied, a suitable theoretical air-fuel ratio cannot be set unless an ethanol concentration sensor is additionally mounted. If a suitable theoretical air-fuel ratio cannot be set, injection amount feedback control which keeps emission and the like favorable cannot be carried out by the air-fuel ratio calculated based on the output value of the cylinder internal pressure sensor.

Figure 2:
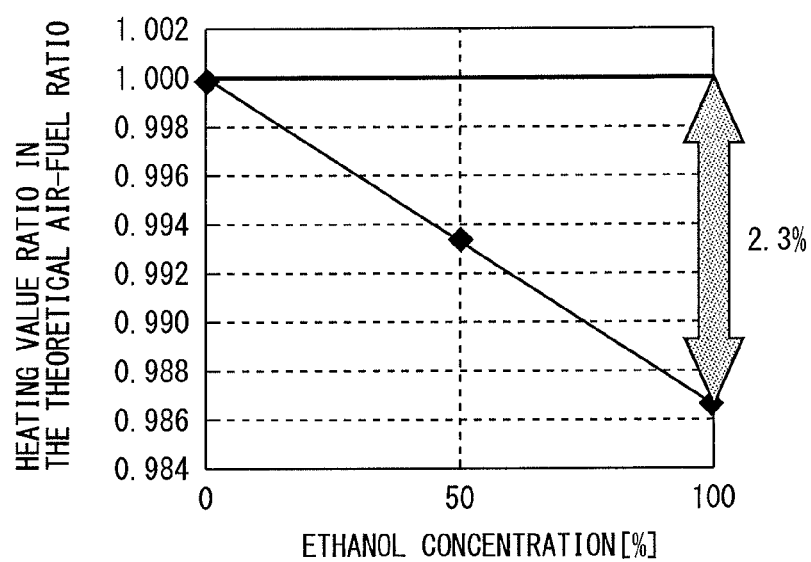
FIG. 2 is a diagram showing a relation of the ethanol concentration in a fuel and a heating value ratio in stoichiometry.

Next, a control outline of the present embodiment which solves the problem as above will be described with use of FIG. 2. FIG. 2 is a diagram showing a relation of the ethanol concentration in a fuel and a heating value ratio in stoichiometry (excess air ratio λ=1) (the heating value in stoichiometry at a concentration other than E0/the heating value in stoichiometry at E0). The theoretical air-fuel ratio is approximately 14.6 at E0, and approximately 9.0 at E100, which are different values. More specifically, in stoichiometry, a larger amount of fuel is injected at E100 than at E0 (approximately 1.5 times). As shown in FIG. 2, even if the ethanol concentration differs, the difference in the heating value ratio in stoichiometry is very small. According to the knowledge of the inventor, the result that the difference is approximately 2.3% between E0 and E100 is obtained. Further, in the predetermined excess air ratio, substantially the same result as in the case of stoichiometry is obtained. According to the result like this, the target controlled variable is set as the heating value, whereby injection amount feedback control which does not receive influence of an ethanol concentration is enabled.

Therefore, in the system of the present embodiment, the correction amount corresponding to the difference of the heating value and the theoretical heating value is fed back to the fuel injection amount so as to cause the heating value to correspond to the theoretical heating value in a predetermined excessive air ratio.

(Control Routine)

Figure 3:
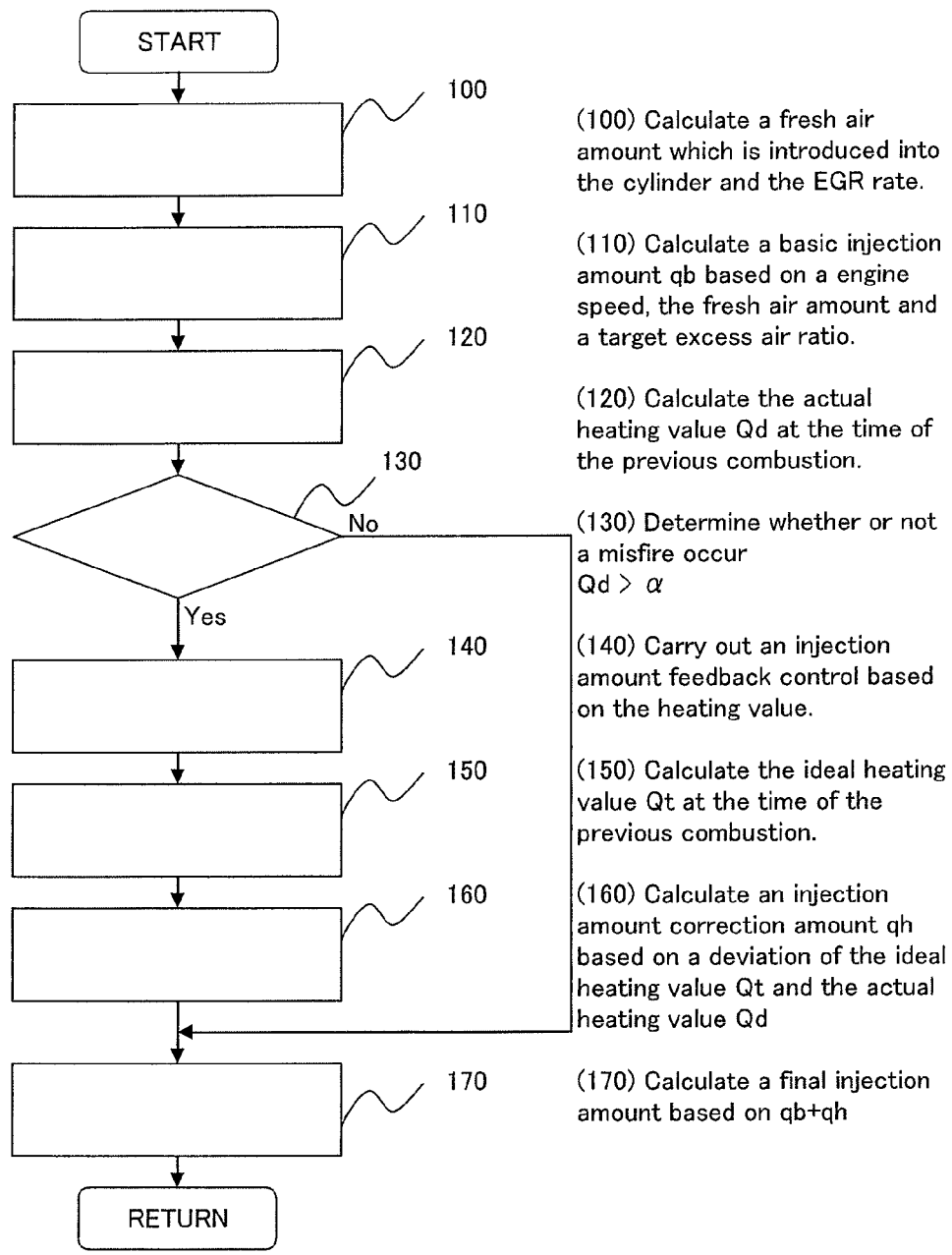
FIG. 3 is a flowchart illustrating a control routine that is executed by the ECU 50 according to a first embodiment of the present invention.
Figure 4:
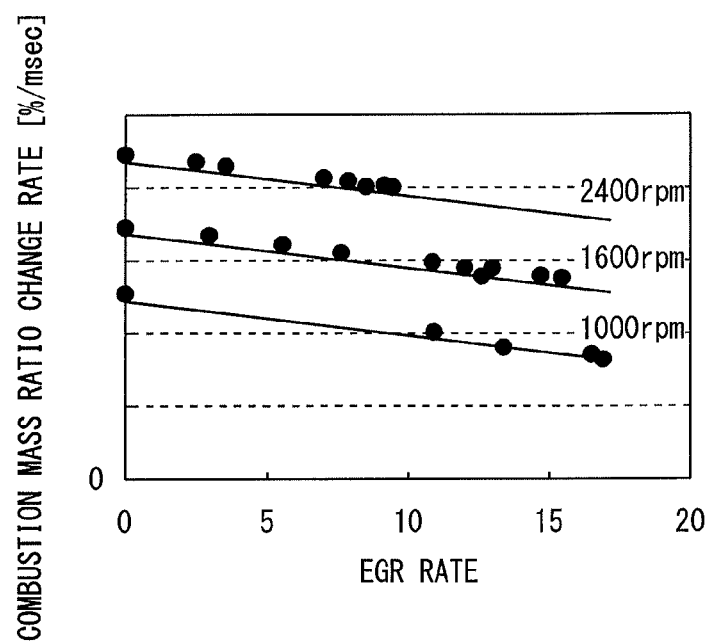
FIG. 4 is a diagram showing a relation of a combustion mass ratio change rate and the EGR rate for each engine speed NE according to a first embodiment of the present invention.

FIG. 3 is a flowchart of a control routine executed by the ECU 50 in order to realize the operation described above. The control routine is executed in each cycle, for example. In the routine shown in FIG. 3, a cylinder internal fresh air amount KL which is introduced into the cylinder and the EGR rate are calculated first (step 100). FIG. 4 is a diagram showing a relation of a combustion mass ratio change rate and the EGR rate for each engine speed NE. In the ECU 50, a relation map shown in FIG. 4 is stored in advance. The ECU 50 calculates the engine speed NE from the signal CA of the crank angle sensor 18. Further, the ECU 50 calculates the combustion mass ratio change rate (combustion speed) from a combustion pressure detected by the cylinder internal pressure sensor 16 which is synchronized with the crank angle. Subsequently, the ECU 50 acquires the EGR rate (internal EGR+external EGR) corresponding to the engine speed NE and the combustion mass ratio change rate from the relation map shown in FIG. 4. Further, the ECU 50 calculates a total amount of fresh air and an EGR gas from a compression pressure in the compression stroke, and calculates the cylinder internal fresh air amount KL from the total amount and the EGR rate.

Next, a basic injection amount qb is calculated based on the engine speed NE, the cylinder internal fresh air amount KL and a target excess air ratio (step 110). In the ECU 50, a map which sets the basic injection amount qb corresponding to the engine speed NE, the cylinder internal fresh air amount KL and the target excess air ratio is stored in advance. The target excess air ratio is set at, for example, stoichiometry (excess air ratio λ=1).

Subsequently, based on the output value of the cylinder internal pressure sensor 16, a cumulative heating value after start of the combustion is calculated at each crank angle (step 120). The cumulative heating value is calculated from expression (1) based on a cylinder internal pressure $P(\theta_1)$ and a cylinder internal volume $V(\theta_1)$ in a crank angle $\theta_1$ before combustion, a cylinder internal pressure $P(\theta_2)$ and a cylinder internal volume $V(\theta_2)$ in a crank angle $\theta_2$ after start of the combustion, a constant $\alpha_A$ empirically obtained, and a specific heat ratio κ. In regard with expression (1), the detailed explanation is described in Japanese Patent Laid-Open No. 2006-144643 and the like. Therefore, in the description of the present embodiment, the description thereof will be omitted.

[Expression 1]

$$Qd = Q_{\theta 1}^{\theta 2} = \alpha_A \times \{P(\theta_2) \cdot V^\kappa(\theta_2) - P(\theta_1) \cdot V^\kappa(\theta_1)\} \quad (1)$$

Incidentally, the heating value detected after the end of the combustion is significantly influenced by an output error due to distortion in the sensor interior due to cooling loss and heat reception of the cylinder internal pressure sensor 16. Further, in the time period after the exhaust valve opens, a value of the cylinder internal volume V becomes large, and the heating value is unlikely to be accurately detected due to noise or the like. Furthermore, when the detection timing of the heating value is set as $dQ/d\theta=0$, if AD conversion of the cylinder internal pressure sensor 16 is carried out at a long interval such as 10 CA, for example, $dQ/d\theta=0$ is not necessarily detected, or the heating value is likely to be detected in erroneous timing due to the influence of a noise amplitude or the like.

Therefore, in the system of the present embodiment, of the cumulative heating value calculated by formula (I), the maximum value in the time period until the exhaust valve opens is determined as an actual heating value Qd. The timing in which the exhaust valve opens is calculated from the signal CA of the crank angle sensor 18. According to the configuration like this, the actual heating value Qd can be detected with high precision without an influence to the problems described above.

After the processing of step 120, it is determined whether or not a misfire occurs by comparing the actual heating value Qd and a threshold value α (step 130). In the ECU 50, the threshold value α which is determined by an experiment or the like as such a heating value as not to cause a misfire. When the actual heating value Qd is larger than the threshold value α, it is determined that a misfire does not occur.

In step 130, when it is determined that a misfire does not occur, injection amount feedback control based on the heating value which is described in detail in steps 150 to 170 is started (step 140). The injection amount feedback control in the present embodiment is to make correction by adding or subtracting the injection amount correction amount corresponding to the difference between the actual heating value Qd and an ideal heating value Qt to or from the basic injection amount qb so as to cause the actual heating value Qd to correspond to a target heating value (the ideal heating value Qt which will be described later).

First, the ideal heating value Qt at the time of the previous combustion is calculated (step 150). More specifically, in the previous cycle in which combustion is already finished, how much heating value is generated if a fuel in an optimal injection amount is injected is calculated. In the ECU 50, a map which sets the ideal heating value Qt corresponding to the engine speed NE and the cylinder internal fresh air amount KL is stored for each target excess air ratio. The ideal heating value Qt tends to increase linearly with increase in the cylinder internal fresh air amount KL. The ECU 50 acquires the ideal heating value Qt corresponding to the engine speed NE and the cylinder internal fresh air amount KL in the previous cycle from the above described map.

Subsequently, based on a deviation of the ideal heating value Qt and the actual heating value Qd, an injection amount correction amount qh is calculated (step 160). In the ECU 50, an injection amount correction map which sets the injection amount correction amount qh, which is larger in a positive value as the actual heating value Qd is smaller than the ideal heating value Qt, and is larger in a negative value as the actual heating value Qd is larger than the ideal heating value Qt is stored. The ECU 50 acquires the injection amount correction amount qh corresponding to the deviation between the ideal heating value Qt and the actual heating value Qd from the injection amount correction map.

Subsequently, the injection amount correction amount qh is added to the basic injection amount qb calculated in step 110, and a final injection amount is calculated (step 170). The ECU 50 injects a fuel corresponding to the final injection amount to the injector 14. Thereby, the injection amount feedback control is carried out so as to cause the actual heating value Qd to correspond to the ideal heating value Qt. Thereafter, the present routine is finished.

When it is determined that a misfire occurs in step 130, the value of the injection amount correction amount qh is set at zero. Therefore, in step 170, the basic injection amount qb is calculated as the final injection amount.

As described above, according to the routine shown in FIG. 3, the injection amount correction amount qh corresponding to the difference between the actual heating value Qd and the ideal heating value Qt can be fed back to the basic injection amount qb so that the actual heating value Qd is caused to correspond to the ideal heating value Qt in stoichiometry. The target controlled variable is set as the heating value, whereby the system with high robustness which does not receive influence of the ethanol concentration (fuel property) can be realized. Further, according to the system of the present embodiment, an air-fuel ratio sensor and an ethanol concentration sensor are not additionally required, and therefore, cost reduction can be achieved. Furthermore, according to the routine shown in FIG. 3, in the process until the final injection amount is calculated, an injection time is not used as a parameter. Therefore, the influence of an injection variation by the injector 14 can be eliminated, and injection amount feedback control with high precision can be realized.

Incidentally, in the system of embodiment 1 described above, the EGR rate is calculated by the processing of step 100, but the calculation method of the EGR rate is not limited to this. For example, in step 100, an external EGR rate is acquired from a map which sets the estimated value of the external EGR rate corresponding to the output values of the air flow meter 24, the intake pressure sensor 30 and the throttle opening sensor 27, and an internal EGR rate may be acquired from a map which sets the estimated value of the internal EGR rate corresponding to the set value of a valve overlap amount. The same thing also applies to the following embodiments.

Further, in the system of embodiment 1 described above, the cumulative heating value is calculated based on expression (1), but the calculation method of the cumulative heating value is not limited to this. For example, in step 120, the cumulative heating value may be calculated based on the following expression (2). The same thing also applies to the following embodiments.

[Expression 2]

$$Qd = Q_{\theta 1}^{\theta 2} = \int_{\theta 1}^{\theta 2} \frac{dQ}{d\theta} = \int_{\theta 1}^{\theta 2} \left\{ \frac{dP}{d\theta} \cdot V + \kappa \cdot P \cdot \frac{dV}{d\theta} \right\} \cdot \frac{1}{\kappa - 1} \quad (2)$$

Further, in the system of embodiment 1 described above, the ideal heating value Q1 is described as in stoichiometry (the excess air ratio λ=1), but, for example, a predetermined excess air ratio is set, and the ideal heating value Qt in the excess air ratio may be used.

Figure 5:
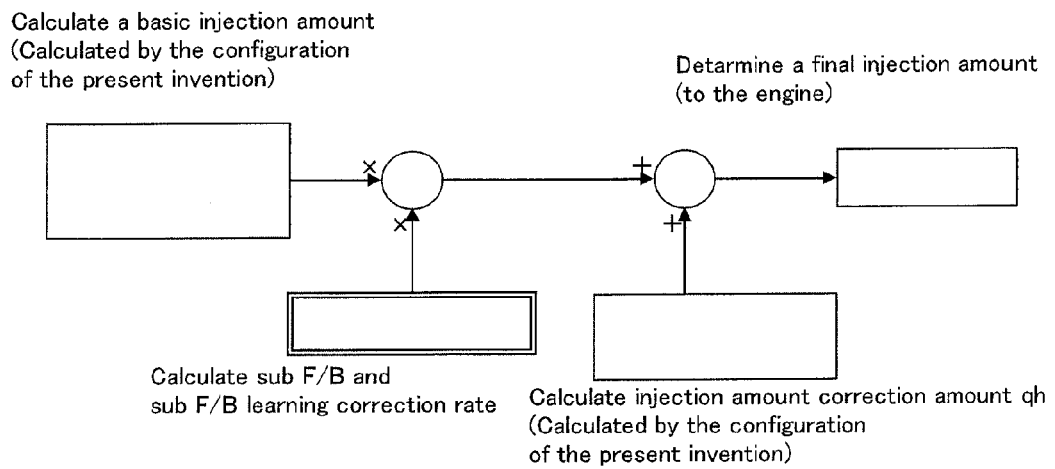
FIG. 5 is a diagram showing an outline of sub feedback control according to a first embodiment of the present invention.

Further, in the system of embodiment 1 described above, the cylinder internal pressure sensor 16 substitutes for the function of the air-fuel sensor upstream of the catalyst 34, and, in addition to which, a sub O2 sensor 42 may be disposed downstream of the catalyst 34. FIG. 5 is a diagram showing an outline of sub feedback control. In the sub feedback control, the injection amount correction amount qh calculated in step 160 is further corrected so that the output of the sub O2 sensor 42 mounted downstream of the catalyst 34 is stoichiometric output. The same thing also applies to the following embodiments.

In embodiment 1 described above, the cylinder internal pressure sensor 16 corresponds to "cylinder internal pressure sensor" in the aforementioned first aspect. Further, in this case, the ECU 50 executes the processing of the above described step 100, whereby "cylinder internal pressure fresh air amount calculating means" in the aforementioned first aspect is realized. The ECU 50 executes the processing of the above described step 120, whereby "actual heating value calculating means" in the aforementioned first aspect is realized. The ECU 50 executes the processing of the above described step 150, whereby "target heating value calculating means" in the aforementioned first aspect is realized. The ECU 50 executes the processing of the above described step 160 to step 170, whereby "feedback means" in the aforementioned first aspect is realized. Further, in embodiment 1, the actual heating value Qd calculated in the above described step 120 corresponds to "actual heating value" in the aforementioned first and second aspects, and the ideal heating value Qt calculated in the above described step 150 corresponds to "target heating value" in the aforementioned first aspect, respectively.

Embodiment 2

[System Configuration of Embodiment 2]

Next, embodiment 2 of the present invention will be described with reference to FIG. 6 to FIG. 8. A system of the present embodiment can be realized by causing the ECU 50 to carry out routines of FIG. 3 and FIG. 8 which will be described later in the configuration shown in FIG. 1.

[Characteristic Control in Embodiment 2]

In embodiment 1 described above, the injection amount feedback control which causes the actual heating value Qd to correspond to the ideal heating value Qt in stoichiometry (excess air ratio $\lambda$=1) is carried out. Incidentally, in the control of the engine 10, a rich request and a lean request are made to keep drivability, emission and the like favorable, and operations in a rich region and a lean region are temporarily requested in some cases.

Figure 6:
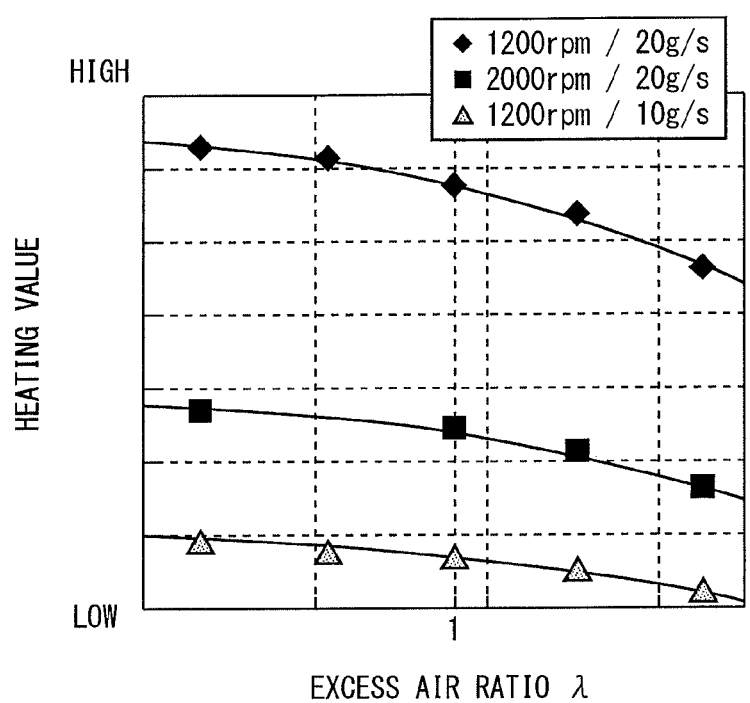
FIG. 6 is a diagram showing an experimental result of investigating the relation of the excess air ratio λ and the heating value for each operation condition.

FIG. 6 is a diagram showing an experimental result of investigating the relation of the excess air ratio $\lambda$ and the heating value for each operation condition. As shown in FIG. 6, the heating value tends to increase as the excess air ratio $\lambda$ becomes richer than stoichiometry in the same operation conditions, and tends to reduce as the excess air ratio $\lambda$ becomes leaner. In more detail, for example, in a gasoline fuel, up to the vicinity of an air-fuel ratio of 11, the heating value tends to increase as the excess air ratio $\lambda$ becomes richer. Further, a practical use region of air-fuel ratio control is an air fuel ratio of approximately 12 to 18. In order to enhance precision of the injection amount feedback control, the ideal heating value Qt is desirably corrected based on change of the heating value corresponding to the target excess air ratio.

However, the heating value significantly differs in each of the operation conditions such as the engine speed NE and the injection amount per unit time (FIG. 6). Therefore, if the ideal heating value Qt is to be corrected by directly using the relation shown in FIG. 6, necessity to adapt the correction amount to each operation condition arises. Further, the problem of requiring a large ROM capacity of the ECU 50 also arises.

Next, the control outline of the present embodiment which solves the problem as above will be described with use of FIG. 7. FIG. 7 is a diagram expressing a relation of the excess air ratio $\lambda$ and a heating value ratio (the heating value in the region except for stoichiometry/the heating value in stoichiometry) in the same operation conditions as FIG. 6. The heating value ratio is expressed by a secondary function of the excess air ratio $\lambda$. As shown in FIG. 7, the heating value ratio corresponding to the excess air ratio $\lambda$ is uniquely determined irrespective of the operation conditions. The heating value ratio tends to be larger as the excess air ratio $\lambda$ becomes richer than stoichiometry, and tends to be smaller as the excess air ratio $\lambda$ becomes leaner.

Figure 7:
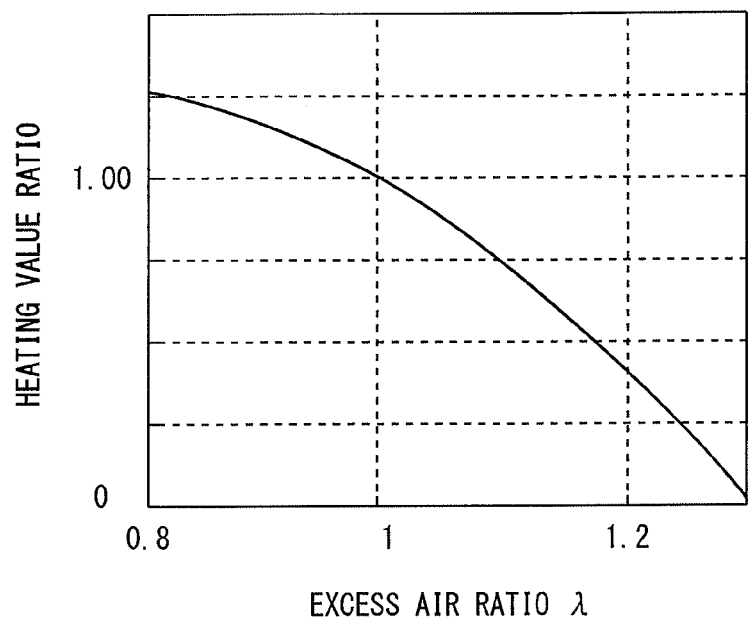
FIG. 7 is a diagram expressing a relation of the excess air ratio λ and a heating value ratio in the same operation conditions as FIG. 6.

Therefore, in the system of the present embodiment, the ideal heating value Qt is corrected based on the relation between the excess air ratio $\lambda$ and the heating value ratio shown in FIG. 7.

(Control Routine)

Figure 8:
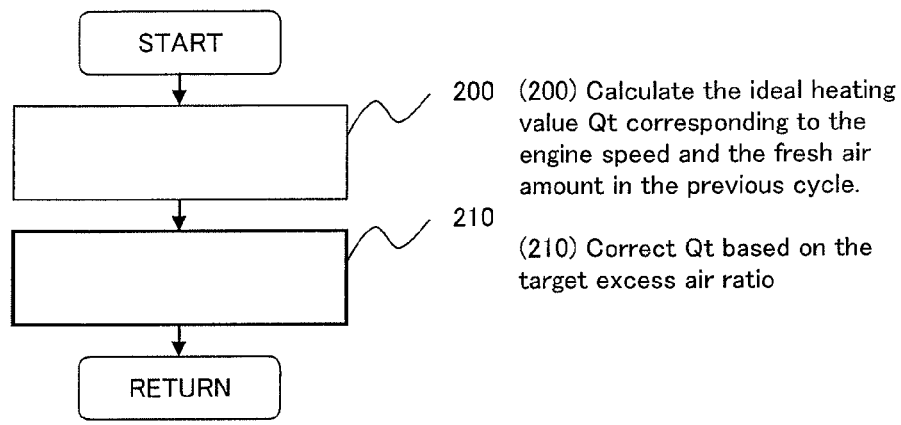
FIG. 8 is a flowchart of a sub routine executed by the ECU 50 according to a second embodiment of the present invention.

FIG. 8 is a flowchart of a sub routine executed by the ECU 50 in order to realize the aforementioned function. The routine is a sub routine which is executed in place of the processing of step 150 of FIG. 3. In other words, the control routine of the present embodiment is the same as the routine shown in FIG. 3 except for the point that the processing of step 150 of FIG. 3 is replaced with the sub routine of FIG. 8. Hereinafter, in the control routine of the present embodiment, the description of the same steps as the steps shown in FIG. 3 will be omitted or simplified.

The sub routine shown in FIG. 8 is executed after the processing of step 140 shown in FIG. 3. In this sub routine, the ideal heating value Qt at the time of the previous combustion is calculated (step 200). More specifically, in the previous cycle in which combustion is already finished, what heating value is generated if a fuel in an optimal injection amount is injected is calculated. In the ECU 50, a map which sets the ideal heating value Qt corresponding to the engine speed NE and the cylinder internal fresh air amount KL is stored for each target excess air ratio. The ideal heating value Qt linearly increases with increase of the cylinder internal fresh air amount KL. The ECU 50 acquires the ideal heating value Qt corresponding to the engine speed NE and the cylinder internal fresh air amount KL in the previous cycle from the above described map.

Next, based on the target excess air ratio, the ideal heating value Qt is corrected (step 210). In the ECU 50, the map which sets the target values (target excess air ratio) of the excess air ratio $\lambda$ corresponding to the operation requests (a rich request and a lean request) which are made to keep drivability, emission and the like favorable in the other routines is stored in advance. For example, when a rich request is made, the target excess air ratio is set to be smaller than 1 (for example, the excess air ratio $\lambda$=0.9). When a lean request is made, the target excess air ratio is set to be larger than 1 (for example, the excess air ratio $\lambda$=1.1). Further, in the ECU 50, the relation map shown in FIG. 7 described above is stored in advance. From the relation map, the heating value ratio corresponding to the target excess air ratio is acquired. The ECU 50 sets the acquired heating value as the correction coefficient, and multiplies the ideal heating value Qt by the correction coefficient to set the result as a new ideal heating value Qt.

After the processing of step 210, the processing of step 160 and the following steps of FIG. 3 is executed based on the new ideal heating value Qt.

As described above, according to the sub routine shown in FIG. 8, the ideal heating value Qt can be corrected based on the relation between the target excess air ratio and the heating value ratio. Therefore, according to the system of the present embodiment, precision of the injection amount control adapted to a catalyst purification window can be enhanced. Further, according to the relation of the target excess air ratio and the heating value ratio, the system with high robustness which does not receive influence of the fuel property and the operation conditions can be realized. Further, according to the system of the present embodiment, the ideal heating value Qt can be corrected based on the single relation map shown in FIG. 7, and therefore, adaptation steps corresponding to the operation conditions can be significantly reduced. In addition, the ROM capacity of the ECU 50 can be significantly reduced.

In embodiment 2 described above, the ECU 50 executes the processing of the above described step 210, whereby "target excess air ratio setting means" and "correction means" in the aforementioned third aspect are respectively realized.

Embodiment 3

[System Configuration of Embodiment 3]

Next, embodiment 3 of the present invention will be described with reference to FIG. 9 to FIG. 10. The system of the present embodiment can be realized by causing the ECU 50 to carry out the routines of FIG. 3 and FIG. 10 which will be described later in the configuration shown in FIG. 1.

[Characteristic Control in Embodiment 3]

In embodiment 1 described above, the injection amount feedback control which causes the actual heating value Qd to correspond to the ideal heating value Qt in stoichiometry (excess air ratio $\lambda=1$) is carried out, irrespective of the fuel property. Incidentally, in control of the engine 10, ignition timing control which advances/delays ignition timing of the spark plug 12 from MBT (Minimum Advance for Best Torque) is also carried out, in response to the operation requests (requests concerning fuel efficiency, emission and the like).

According to the knowledge of the inventor, the total heating value decreases when the ignition timing is advanced from MBT. Further, when the ignition timing is delayed from MBT, the total heating value increases. Therefore, the heating value in the combustion timing when a combustion ratio becomes 50% (hereinafter, simply called a 50% combustion point) becomes higher toward a delay side, and becomes lower toward an advance side. It is considered that the heating value is influenced by the ignition timing in this manner because an afterburning amount of HC changes in accordance with a combustion gravity center position. In order to enhance the precision of the injection amount feedback control, the ideal heating value Qt is desirably corrected in the light of the influence on the heating value by the ignition timing like this.

However, the heating value significantly differs in accordance with each of the operation conditions such as the engine speed NE and the cylinder internal fresh air amount KL. Therefore, if the ideal heating value Qt is to be corrected for each of the operation conditions, the necessity to adapt the correction amount to each of the operation conditions arises. Further, the problem of requiring a large ROM capacity of the ECU 50 arises.

Next, a control outline of the present embodiment which solves the problems as above will be described with use of FIG. 9. In the present embodiment, the 50% combustion point in MBT (Hereinafter, called an MBT 50% combustion point.) is 8 CA after the compression upper dead center (Hereinafter, called an ATDC8CA.). FIG. 9 is a diagram expressing a relation of the deviation from ATDC8CA of the 50% combustion point in ignition timing other than MBT and the heating value ratio (the heating value at the 50% combustion point in ignition timing other than MBT/the heating value at the 50% combustion point in MBT). As shown in FIG. 9, irrespective of the operation conditions, the relation of the deviation and the heating value ratio described above is uniquely determined. Further, the heating value ratio tends to become larger as the ignition timing is delayed from MBT, and tends to become smaller as the ignition timing is advanced from MBT.

Figure 9:
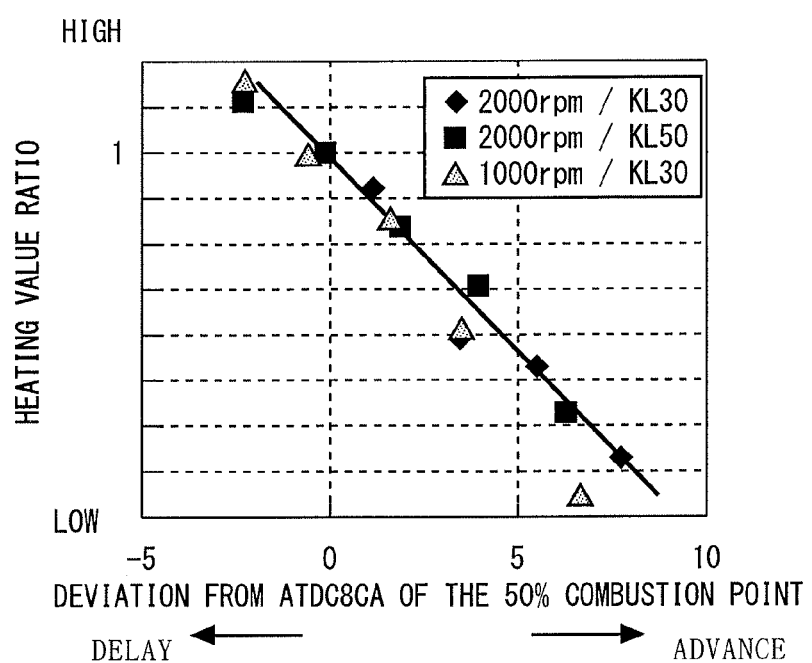
FIG. 9 is a diagram expressing a relation of the deviation from ATDC8CA of the 50% combustion point in ignition timing other than MBT and the heating value ratio according to a third embodiment of the present invention.

Therefore, in the system of the present embodiment, the ideal heating value Qt is corrected based on the relation of the deviation from ATDC8CA of the 50% combustion point and the heating value ratio shown in FIG. 9.

(Control Routine)

Figure 10:
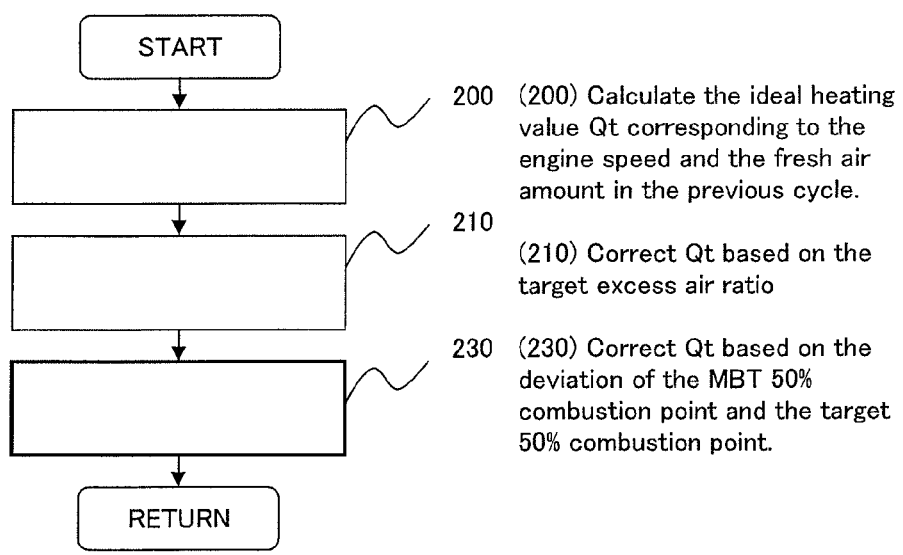
FIG. 10 is a flowchart of a sub routine executed by the ECU 50 according to a third embodiment of the present invention.

FIG. 10 is a flowchart of a sub routine executed by the ECU 50 in order to realize the above described function. The routine is a sub routine which is executed in place of the processing of step 150 of FIG. 3. The control routine of the present embodiment is the same as the routines shown in FIG. 3 and FIG. 8 except for the point that step 230 is added after the processing of step 210 of FIG. 8. Hereinafter, in the control routine of the present embodiment, the same steps as the steps shown in FIG. 3 and FIG. 8 are assigned with the same reference signs, and the description thereof will be omitted or simplified.

In the sub routine shown in FIG. 10, after the processing of step 210, the ideal heating value Qt is corrected based on the relation of the deviation from ATDC8CA of the 50% combustion point and the heating value ratio shown in FIG. 9 (step 230). The description will be made more specifically. In the ECU 50, a map which sets target values of the 50% combustion point (Hereinafter, called a target 50% combustion point.) corresponding to the operation requests (requests concerning fuel efficiency, emission and the like) in the other routines is stored in advance. From this map, the 50% combustion point corresponding to the operation conditions is acquired, and is set as the target 50% combustion point. Subsequently, the deviation of the MBT 50% combustion point and the target 50% combustion point is calculated. Further, in the ECU 50, the relation map shown in FIG. 9 described above is stored in advance. From this relation map, the heating value ratio corresponding to the above described deviation is acquired. The ECU 50 sets the acquired heating value ratio as a correction coefficient, and multiplies the ideal heating value Qt by the correction coefficient to set the result as a new ideal heating value Qt.

After the processing of step 230, the processing of step 160 and the following steps of FIG. 3 is executed based on the new ideal heating value Qt.

As described above, according to the sub routine shown in FIG. 10, the ideal heating value Qt can be corrected based on the relation of the deviation from ATDC8CA of the target 50% combustion point and the heating value ratio. Therefore, according to the system of the present embodiment, the precision of the injection amount control adapted to the catalyst purification window can be enhanced. Further, according to the relation of the deviation from ATDC8CA of the target 50% combustion point and the heating value ratio, the system with high robustness which does not receive influence from the fuel property and the operation conditions can be realized. Further, according to the system of the present embodiment, the influence factor on the heating value is further considered as compared with the aforementioned embodiment, whereby the ideal heating value Qt can be corrected with higher accuracy, and the suitable injection amount control adapted to the catalyst purification window can be realized.

Further, according to the system of the present embodiment, the ideal heating value Qt can be corrected based on the single relation map shown in FIG. 9, and therefore, the number of the adaptation steps corresponding to the operation conditions can be significantly reduced. Further, the ROM capacity of the ECU 50 can be significantly reduced.

Incidentally, in the system of embodiment 3 described above, correction of the ideal heating value Qt in step 230 is used in combination with correction of the ideal heating value Qt in step 210, but correction of the ideal heating value is not limited to this. Only the processing of step 230 may be performed without performing the processing of step 210. The same thing also applies to the following embodiments.

Further, in the system of embodiment 3 described above, the relation map shown in FIG. 9 is set with the 50% combustion point as a reference, but the reference of the combustion point is not limited to this. The reference of the combustion point may be a combustion point in an optional combustion ratio.

Further, in the system of embodiment 3 described above, the 50% combustion point in MBT is set as ATDC8CA, but this value differs depending on the system, and is not limited to ATDC8CA.

In embodiment 3 described above, the ECU 50 executes the processing of the above described step 230, whereby "target combustion point setting means" and "correction means" in the aforementioned fifth aspect are respectively realized.

Embodiment 4

[System Configuration of Embodiment 4]

Next, with reference to FIG. 11 and FIG. 12, embodiment 4 of the present invention will be described. A system of the present embodiment can be realized by causing the ECU 50 to carry out the routines of FIG. 3 and FIG. 11 which will be described later in the configuration shown in FIG. 1.

[Characteristic Control in Embodiment 4]

In embodiment 3 described above, the target 50% combustion point corresponding to an operation request is set, and ignition timing control is performed. However, in the process of the ignition timing control, a control error occurs. If a control error occurs, the heating value changes. In order to enhance precision of the injection amount feedback control, the actual heating value Qd is desirably corrected in accordance with the change amount of the heating value, in the light of the influence on the heating value by the control error like this.

However, the heating value significantly differs in accordance with each of the operation conditions such as the engine speed NE and the cylinder internal fresh air amount KL. Therefore, if the actual heating value Qd is to be corrected in each of the operation conditions, the necessity to adapt the correction amount in each of the operation conditions arises. Further, the problem of requiring a large ROM capacity of the ECU 50 also arises.

Next, a control outline of the present embodiment which solves the problem as above will be described with use of FIG. 11. In the present embodiment, the 50% combustion point in MBT (MBT 50% combustion point) is assumed to be 8 CA after the compression upper dead center (ATDC8CA). FIG. 11 is a diagram expressing a relation of a deviation from ATDC8CA of the 50% combustion point in the ignition timing other than MBT, and a heating value ratio (the heating value at the 50% combustion point in the ignition timing other than MBT/the heating value at the MBT 50% combustion point). As shown in FIG. 11, the relation of the deviation and the heating value ratio described above is uniquely determined, irrespective of operation conditions. Further, the heating value ratio tends to become larger as the ignition timing is delayed from MBT, and tends to become smaller as the ignition timing is advanced from MBT.

Figure 11:
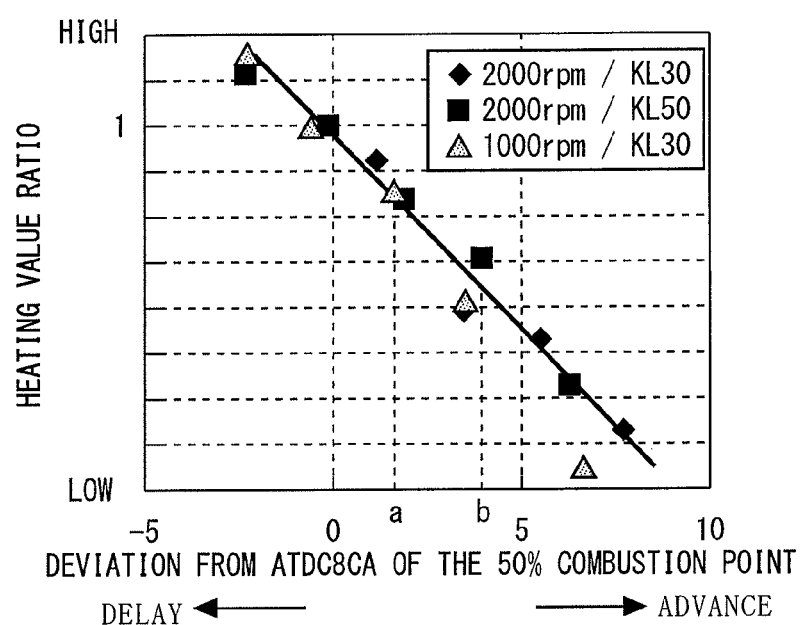
FIG. 11 is a diagram expressing a relation of a deviation from ATDC8CA of the 50% combustion point in the ignition timing other than MBT, and a heating value ratio according to a fourth embodiment of the present invention.

"a" shown in FIG. 11 shows the target 50% combustion point. "b" shown in FIG. 11 shows the actual 50% combustion point (Hereinafter, called an actual 50% combustion point.) which is the result of performing ignition timing control in response to the target 50% combustion point. As described above, such a difference occurs due to a control error. Therefore, in the system of the present embodiment, the actual heating value Qd is corrected based on the difference of the heating value ratio of the target 50% combustion point to the MBT 50% combustion point, and the heating value ratio of the actual 50% combustion point to the MBT 50% combustion point.

(Control Routine)

Figure 12:
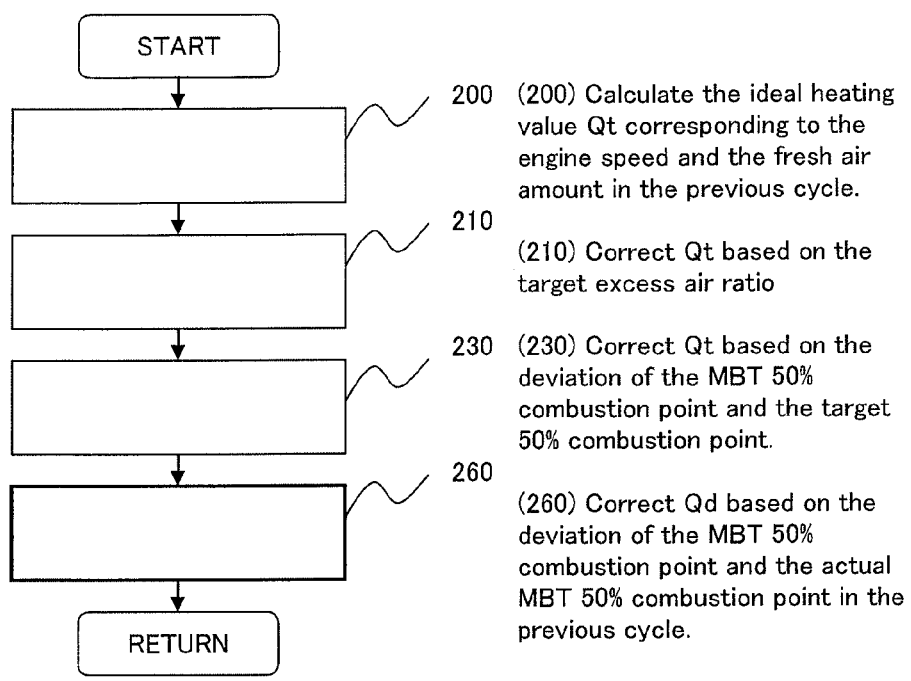
FIG. 12 is a flowchart of a sub routine executed by the ECU 50 according to a fourth embodiment of the present invention.

FIG. 12 is a flowchart of a sub routine executed by the ECU 50, in order to realize the above described function. The routine is a sub routine which is executed in place of the processing of step 150 of FIG. 3. The control routine of the present embodiment is the same as the routines shown in FIG. 3 and FIG. 10 except for the point that step 260 is added after the processing of step 230 of FIG. 10. Hereinafter, in the control routine of the present embodiment, the same steps as the steps shown in FIG. 3 and FIG. 10 are assigned with the same reference signs, and the description thereof will be omitted or simplified.

In the sub routine shown in FIG. 12, the actual heating value Qd is corrected based on the relation of the deviation from ATDC8CA at the target 50% combustion point and the actual 50% combustion point and the heating value ratio shown in FIG. 11 (step 260). The description will be made more specifically. First, as the actual 50% combustion point, a crank angle to be a half of the total heating value in the previous cycle is calculated. Subsequently, the deviation of the MBT 50% combustion point and the actual 50% combustion point is calculated. In the ECU 50, the relation map shown in FIG. 11 described above is stored in advance. From the relation map, the heat generation ratio (Hereinafter, called an actual 50% combustion point heating value ratio.) corresponding to the deviation is acquired.

Further, in the ECU 50, the map which sets the target 50% combustion point corresponding to the operation requests in the other routines is stored in advance. From this map, the target 50% combustion point corresponding to the operation conditions of the previous cycle is set. Next, the deviation of the MBT 50% combustion point and the target 50% combustion point is calculated. Thereafter, from the relation map shown in FIG. 11, the heating value ratio corresponding to the deviation (Hereinafter, called a target 50% combustion point heating value ratio) is acquired.

Thereafter, from the difference of the target 50% combustion point heating value ratio and the actual 50% combustion point heating value ratio, the heating value ratio of the actual 50% combustion point to the target 50% combustion point is obtained. The ECU 50 multiplies the actual heating value Qd by the obtained heating value ratio as the correction coefficient, and sets the result as a new actual heating value Qd.

After the processing of step 260, the processing of step 160 and the following steps of FIG. 3 is executed based on the new actual heating value Qd.

As described above, according to the sub routine shown in FIG. 12, the actual heating value Qd can be corrected based on the relation of the deviation from ATDC8CA at the target 50% combustion point and the actual 50% combustion point and the heating value ratio. Therefore, according to the system of the present embodiment, the precision of the injection amount control adapted to the catalyst purification window can be enhanced. Further, according to the relation with the heating value ratio, the system with high robustness which does not receive the influence of the fuel property and the operation conditions can be realized. Furthermore, according to the system of the present embodiment, the actual heating value Qd can be corrected with high precision in response to the change amount of the heating value due to a control error, and proper injection amount control adapted to the catalyst purification window can be realized.

Further, according to the system of the present embodiment, the actual heating value Qd can be corrected based on the single relation map shown in FIG. 12, and therefore, the number of adaptation steps corresponding to the operation conditions can be significantly reduced. Further, the ROM capacity of the ECU 50 can be significantly reduced.

Incidentally, in the system of embodiment 4 described above, correction of the actual heating value Qd in step 260 is used in combination with correction of the ideal heating value Qt in steps 210 and 230, but the correction is not limited to this. Only the processing of step 260 may be performed, or the processing of each step may be combined. The same thing also applies to the following embodiments.

In embodiment 4 described above, the ECU 50 executes the processing of the above described step 260, whereby "target combustion point setting means", "actual combustion point calculating means" and "actual heating value correcting means" in the aforementioned eighth aspect are realized respectively.

Embodiment 5

[System Configuration of Embodiment 5]

Next, with reference to FIG. 13 and FIG. 14, embodiment 5 of the present invention will be described. In a system of the present embodiment, a water temperature sensor 44 which detects a water temperature of the engine 10 is added to the configuration of FIG. 1 described above. The water temperature sensor 44 is connected to the input section of the ECU 50. The system of the present embodiment can be realized by causing the ECU 50 to carry out the routines of FIG. 3 and FIG. 14 which will be described later.

[Characteristic Control in Embodiment 5]

In embodiment 1 described above, the injection amount feedback control which causes the actual heating value Qd to correspond to the ideal heating value Qt in stoichiometry (excess air ratio $\lambda=1$) is carried out irrespective of the fuel property. Incidentally, the heating value also changes in accordance with the difference of the cooling loss due to a water temperature (cylinder wall temperature). In order to enhance the precision of the injection amount feedback control, the ideal heating value Qt is desirably corrected in the light of the influence like this.

Figure 13:
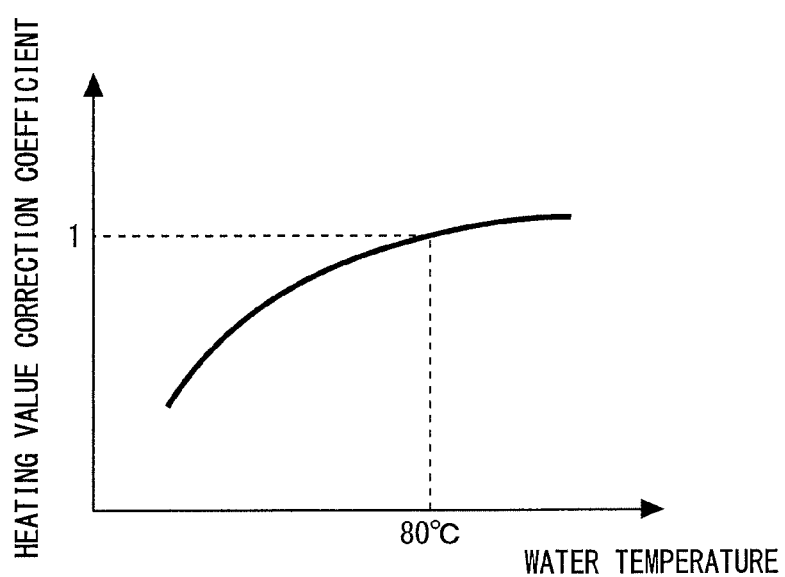
FIG. 13 is a diagram showing a relation of a water temperature and a heating value correction coefficient according to a fifth embodiment of the present invention.

FIG. 13 is a diagram showing a relation of a water temperature and a heating value correction coefficient. The heating value correction coefficient in a completely warmed-up state (for example, 80° C.) is 1. Further, the heating value correction coefficient is not changed in accordance with the operation conditions, but is determined by only the water temperature. Furthermore, the heat generation correction coefficient tends to become smaller as the water temperature decreases below the completely warmed-up state, and tends to become larger as the water temperature increases above the completely warmed-up state. In the system of the present embodiment, the ideal heating value Qt is corrected based on the relation of the water temperature and the heating value correction coefficient shown in FIG. 13. More specifically, as the water temperature decreases, the ideal heating value Qt is corrected by being decreased.

(Control Routine)

Figure 14:
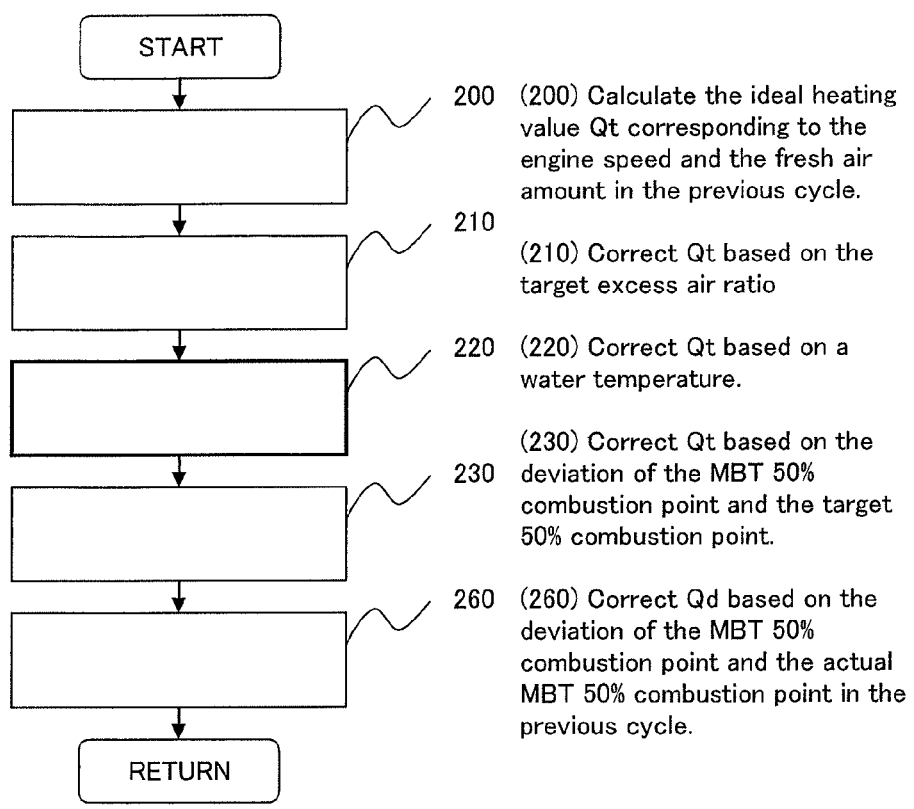
FIG. 14 is a flowchart of a sub routine executed by the ECU 50 according to a fifth embodiment of the present invention.

FIG. 14 is a flowchart of a sub routine executed by the ECU 50 in order to realize the function described above. The routine is a sub routine which is executed in place of the processing of step 150 of FIG. 13. The control routine of the present embodiment is the same as the routines shown in FIG. 3 and FIG. 12 except for the point that step 220 is added after the processing of step 210 of FIG. 12. Hereinafter, in the control routine of the present embodiment, the same steps as the steps shown in FIG. 3 and FIG. 12 are assigned with the same reference signs, and the description thereof will be omitted or simplified.

In the sub routine shown in FIG. 14, after the processing of step 210, the ideal heating value Qt is corrected based on the relation of the water temperature and the heating value correction coefficient shown in FIG. 13 (step 220). First, the water temperature is detected by the water temperature sensor 44. In the ECU 50, the relation map shown in FIG. 13 described above is stored in advance. From the relation map, the heating value correction coefficient corresponding to the water temperature is acquired. The ECU 50 multiplies the ideal heating value Qt by the acquired heating value correction coefficient, and sets the result as a new ideal heating value Qt.

After the processing of step 260, the processing of step 160 and the following steps of FIG. 3 is executed based on the new ideal heating value Qt.

As described above, according to the sub routine shown in FIG. 14, the ideal heating value Qt can be corrected based on the relation of the water temperature and the heating value correction coefficient. Therefore, according to the system of the present embodiment, the precision of the injection amount control adapted to the catalyst purification window can be enhanced. Further, the heating value correction coefficient is determined with only the water temperature as a parameter, and therefore, the number of adaptation steps corresponding to the operation conditions can be significantly reduced. Furthermore, the ROM capacity of the ECU 50 can be significantly reduced.

Incidentally, in the system of embodiment 5 described above, correction of the ideal heating value Qt in step 220 is performed in combination with correction of the ideal heating value Qt in steps 210 and 230, and correction of the actual heating value Qd in step 260, but the correction is not limited to this. Only the processing of step 220, or combination with the processing of each of the steps may be adopted. The same thing also applies to the following embodiments.

In embodiment 5 described above, the water temperature sensor 44 corresponds to "water temperature detecting means" in the aforementioned fourth aspect. Further, in this case, the ECU 50 executes the processing of the above described step 220, whereby "correction means" in the aforementioned fourth embodiment is realized.

Embodiment 6

[System Configuration of Embodiment 6]

Next, with reference to FIG. 15 to FIG. 18, embodiment 6 of the present invention will be described. The system of the present embodiment can be realized by causing the ECU 50 to carry out the routines of FIG. 3 and FIG. 15 which will be described later in the configuration shown in FIG. 1.

[Characteristic Control in Embodiment 6]

In embodiment 1 described above, with attention paid to the point that a difference in heating value ratio in stoichiometry is very small even when the fuel properties differ (FIG. 2), the injection amount feedback control which causes the actual heating value Qd to correspond to the ideal heating value Qt in stoichiometry is carried out. Here, if the ideal heating value Qt can be corrected by also considering the difference in heating value ratio due to difference in latent heat of vaporization according to the fuel properties and the like, it is further desirable. Therefore, in the system of the present embodiment, the ideal heating value Qt is corrected based on the difference in the heating value ratio according to the fuel properties.

(Control Routine)

Figure 15:
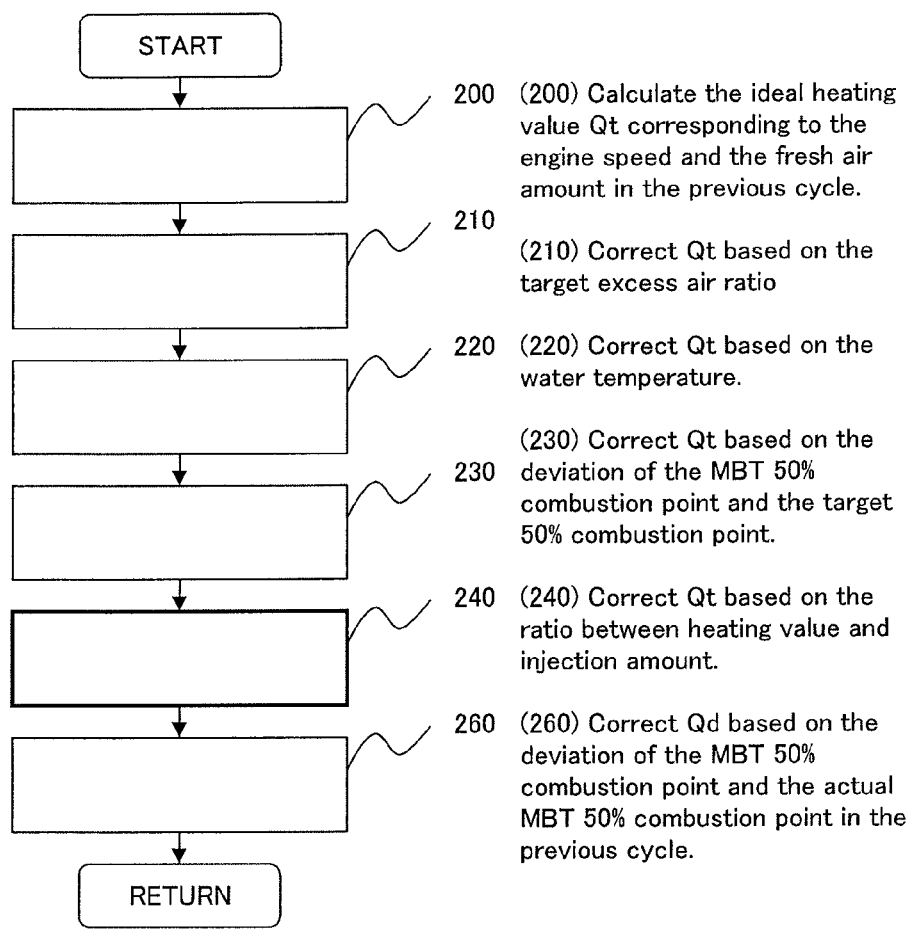
FIG. 15 is a flowchart of a sub routine executed by the ECU 50 according to a sixth embodiment of the present invention.

FIG. 15 is a flowchart of a sub routine executed by the ECU 50 in order to realize the function described above. The routine is a sub routine which is executed in place of the processing of step 150 of FIG. 3. The control routine of the present embodiment is the same as the routines shown in FIG. 3 and FIG. 14 except for that point that step 240 is added after the processing of step 230 of FIG. 14. Hereinafter, in the control routine of the present embodiment, the same steps as the steps shown in FIG. 3 and FIG. 14 will be assigned with the same reference signs and the description thereof will be omitted or simplified.

In the sub routine shown in FIG. 15, the ideal heating value Qt is corrected in accordance with the fuel property after the processing of step 210 (step 240). Hereinafter, the processing in step 240 will be described by being divided into three stages.

Figure 16:
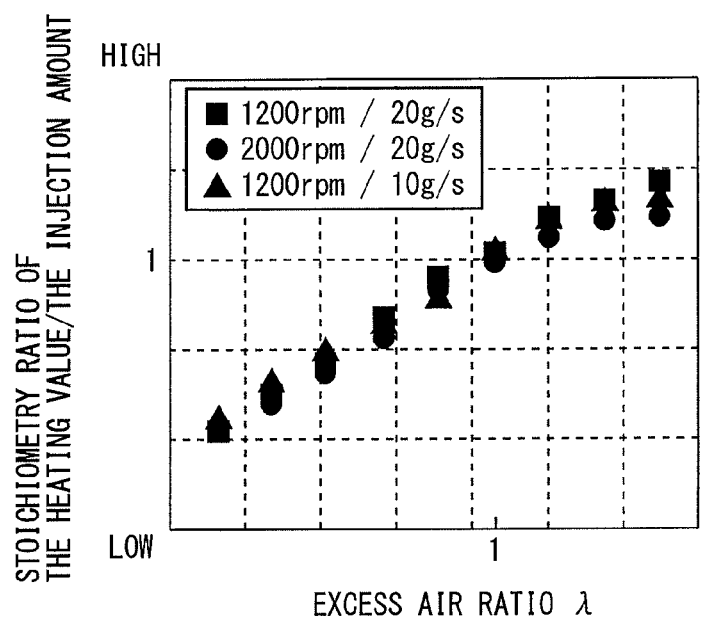
FIG. 16 is a diagram showing a relation of the excess air ratio λ and a stoichiometry ratio of the heating value/the injection amount according to a sixth embodiment of the present invention.
Figure 21:
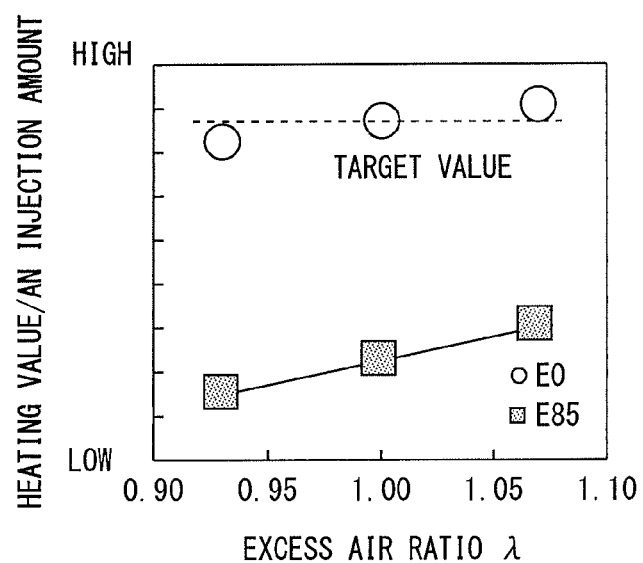
FIG. 21 is a diagram showing a relation of a heating value/an injection amount, and an excess air ratio λ for each ethanol concentration in a fuel.

First, processing of a first stage will be described. FIG. 16 is a diagram showing a relation of the excess air ratio λ and a stoichiometry ratio of the heating value/the injection amount. In the ECU 50, a relation map shown in FIG. 16 is stored. As described above, the heating value/the injection amount (heat generation efficiency) tends to reduce toward a richer side (FIG. 21). Further, according to the stoichiometry ratio, the influence of the operation conditions is not received. From the relation map, the stoichiometry ratio of the heating value/ injection amount corresponding to the target excess air ratio is acquired. The heating value is multiplied by the inverse number of the acquired stoichiometry ratio, whereby the heating value is corrected. By the processing, the change amount of the lower heating value can be corrected in advance.

Figure 17:
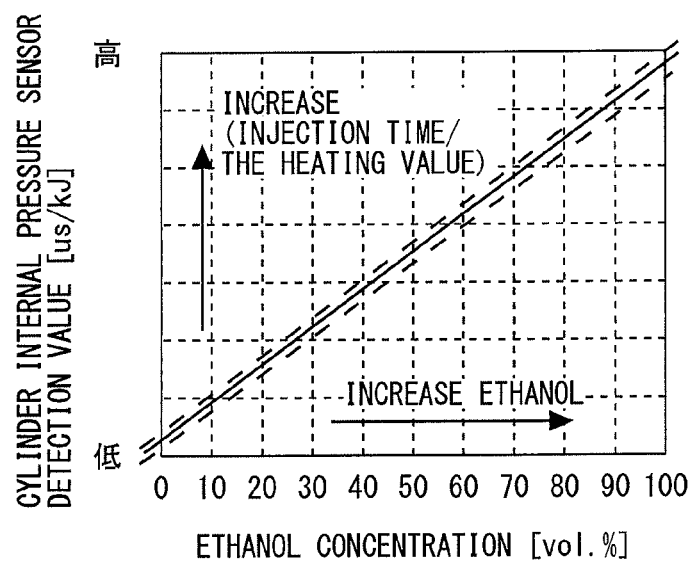
FIG. 17 is a diagram showing a relation of the injection time/the heating value and an ethanol concentration according to a sixth embodiment of the present invention.

Next, processing of a second stage will be described. FIG. 17 is a diagram showing a relation of the injection time/the heating value and an ethanol concentration. In the ECU 50, a relation map shown in FIG. 17 is stored. An injection time corresponds to an injection amount, and is calculated from the control value of the injector 14. From the relation map, the ethanol concentration corresponding to the heating value/the injection time is acquired based on the heating value corrected in the first stage. It is desirable to be based on the heating value and the injection amount in a predetermined number of cycles of the past.

Figure 18:
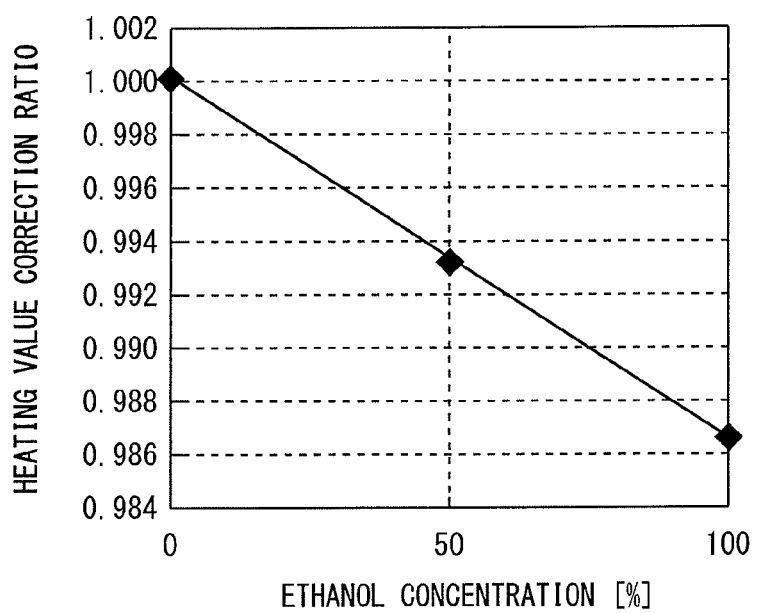
FIG. 18 is a diagram showing a relation of the ethanol concentration and the heating value correction ratio according to a sixth embodiment of the present invention.

Subsequently, the processing of the third stage will be described. FIG. 18 is a diagram showing a relation of the ethanol concentration and the heating value correction ratio. The heating value correction ratio corresponds to the heating value ratio in the stoichiometry in FIG. 2. FIG. 18 has the same tendency as FIG. 2 described above, and therefore, the description thereof will be omitted. In the ECU 50, a relation map shown in FIG. 18 is stored. From the relation map, the heating value correction value corresponding to the ethanol concentration acquired in the second stage is acquired. Thereafter, the ECU 50 multiplies the ideal heating value Qt by the heating value correction value, and sets the result as a new ideal heating value Qt.

After the processing of step 260, the processing of step 160 and the following steps of FIG. 3 is executed based on the new ideal heating value Qt.

As described above, according to the sub routine shown in FIG. 15, the change amount of the lower heating value, which corresponds to the change of the target excess air ratio, is corrected in advance, and thereafter, the combustion property is determined, whereby fuel property detection with higher precision can be performed. As a result, the ideal heating value Qt is corrected with high precision, and suitable injection amount control adapted to the catalyst purification window can be realized.

Incidentally, in the system of embodiment 6 described above, correction of the ideal heating value Qt in step 240 is performed in combination with correction of the ideal heating value Qt in steps 210 to 230, and correction of the actual heating value Qd in step 260, but the correction is not limited to this. Only the processing of step 240, or combination with the processing of each of the steps may be adopted. The same thing also applies to the following embodiment.

In embodiment 6 described above, the ECU 50 executes the processing of the above described step 240, whereby "alcohol concentration acquiring means" and "correction means" in the aforementioned sixth aspect are realized respectively.

Embodiment 7

[System Configuration of Embodiment 7]
Next, with reference to FIG. 19 and FIG. 20, embodiment 6 of the present invention will be described. A system of the present embodiment can be realized by causing the ECU 50 to carry out the routines of FIG. 3 and FIG. 20 which will be described later in the configuration shown in FIG. 1.
[Characteristic Control in Embodiment 7]
In embodiment 1 described above, the injection amount feedback control which causes the actual heating value Qd to correspond to the ideal heating value Qt in stoichiometry (excess air ratio λ=1) is carried out irrespective of the fuel property. Incidentally, the heating value also changes by the specific heat ratio rising and cooling loss reducing due to increase of the EGR gas. In order to enhance precision of the injection amount feedback control, the ideal heating value Qt is desirably corrected in the light of the influence like this.

Figure 19:
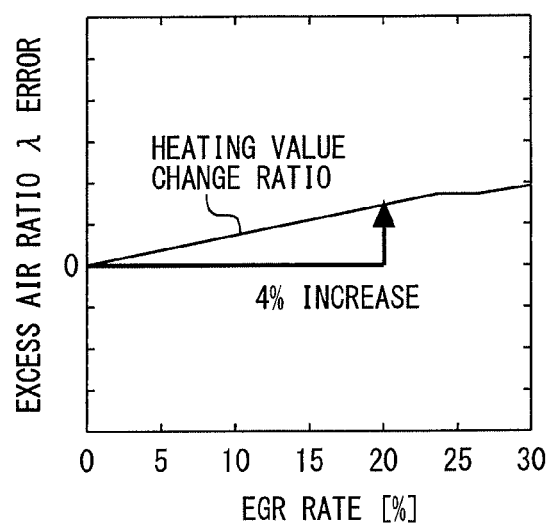
FIG. 19 is a diagram showing a relation of an EGR rate and a heating value change ratio according to a seventh embodiment of the present invention.

FIG. 19 is a diagram showing a relation of an EGR rate and a heating value change ratio. As shown in FIG. 19, irrespective of the operation conditions, the heating value change ratio tends to increase linearly with increase of the EGR rate. For example, the heating value increases by 4% with respect to an EGR rate of 20%. Therefore, in the system of the present embodiment, the ideal heating value Qt is corrected based on the relation of the EGR rate and the heating value change ratio shown in FIG. 19. More specifically, as the EGR rate increases, the ideal heating value Qt is corrected by being increased.

Figure 20:
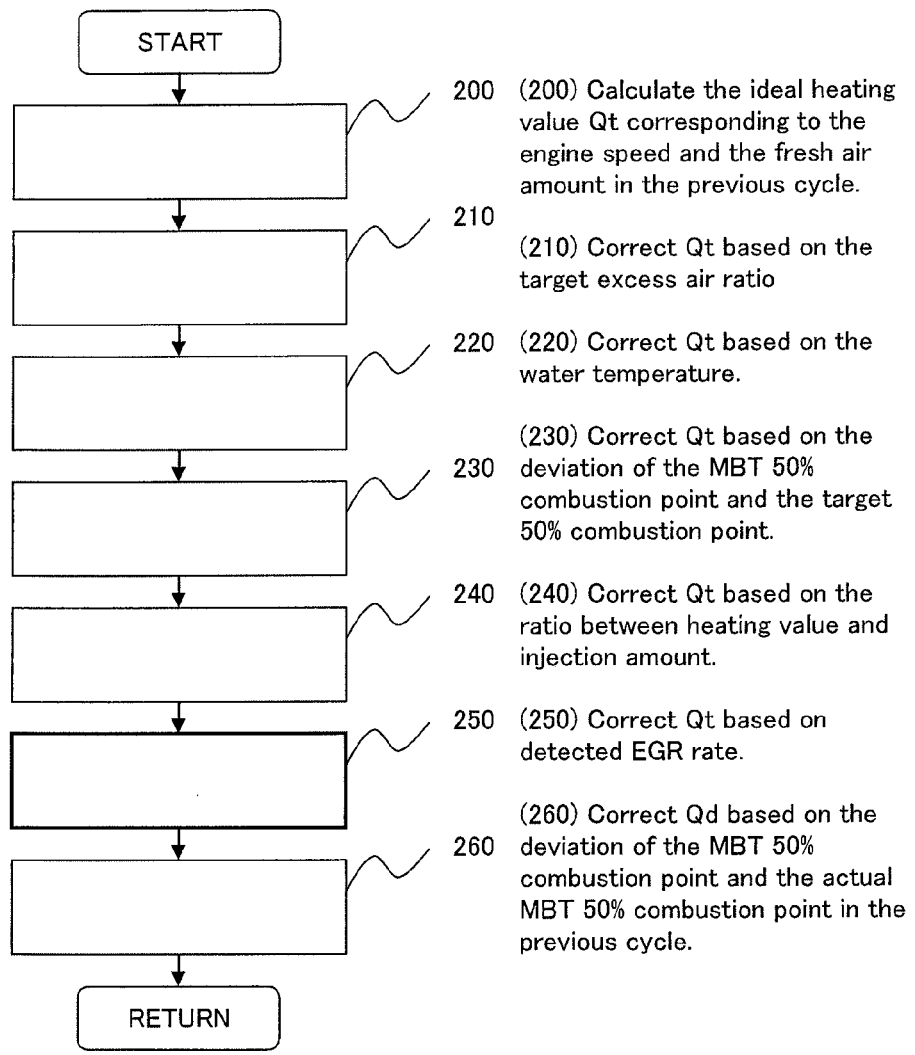
FIG. 20 is a flowchart of a sub routine executed by the ECU 50 according to a seventh embodiment of the present invention.

(Control Routine)
FIG. 20 is a flowchart of a sub routine executed by the ECU 50 in order to realize the function described above. The routine is a sub routine which is executed in place of the processing of step 150 of FIG. 3. The control routine of the present embodiment is the same as the routines shown in FIG. 3 and FIG. 15 except for the point that step 250 is added after the processing of step 240 of FIG. 15. Hereinafter, in the control routine of the present embodiment, the same steps as the steps shown in FIG. 3 and FIG. 15 will be assigned with the same reference signs, and the description thereof will be omitted or simplified.

In the sub routine shown in FIG. 20, after the processing of step 210, the ideal heating value Qt is corrected based on the relation of the EGR rate and the heating value change ratio shown in FIG. 19 (step 250). In the ECU 50, the relation map shown in FIG. 19 described above is stored in advance. In step 210, from the relation map, the heating value change ratio corresponding to the EGR rate calculated in step 100 is acquired. The ECU 50 multiplies the ideal heating value Qt by the acquired heating value change ratio, and sets the result as a new ideal heating value Qt.

After the processing of step 260, the processing of step 160 and the following steps of FIG. 3 is executed based on the new ideal heating value Qt.

As described above, according to the sub routine shown in FIG. 14, the ideal heating value Qt can be corrected based on the relation of the EGR rate and the injection amount change ratio. The heating value change ratio is determined with only the EGR rate as a parameter, and therefore, the system with high robustness which does not receive the influence of the operation conditions can be realized. Further, according to the system of the present embodiment, all the influential factors to the heating value is assumed, whereby suitable injection amount control adapted to the catalyst purification window can be realized.

Incidentally, in the system of embodiment 7 described above, correction of the ideal heating value Qt in step 250 is performed in combination of the correction of the ideal heating value Qt in steps 210 to 240, and the correction of the actual heating value Qd in step 260, but the correction is not limited to this. Only the processing of step 250, or the combination with the processing of each of the steps may be adopted. The same thing also applies to the following embodiment.

In embodiment 7 described above, the ECU 50 executes the processing of the above described step 100, whereby "EGR rate acquiring means" in the aforementioned seventh aspect is realized, and the ECU 50 executes the processing of the above described step 250, whereby "correction means" in the aforementioned seventh aspect is realized, respectively.

The invention claimed is:

1. A control device for an internal combustion engine which can be supplied with fuels of different alcohol concentrations, comprising:
   a cylinder internal pressure sensor that detects a cylinder internal pressure;
   cylinder internal fresh air amount calculating means that calculates a cylinder internal fresh air amount based on a cylinder internal pressure detected by the cylinder internal pressure sensor in a compression stroke;
   actual heating value calculating means that calculates an actual heating value based on a cylinder internal pressure detected by the cylinder internal pressure sensor after start of combustion;
   target heating value calculating means that calculates a basic injection amount injected into the engine by a fuel injector in a predetermined excess air ratio and a target heating value in the predetermined excess air ratio from the cylinder internal fresh air amount calculated by the cylinder internal fresh air amount calculating means, wherein a heating value ratio in the predetermined excess air ratio is determined without an air-fuel sensor; and
   feedback means that feeds a correction amount corresponding to a comparison value of the actual heating value and the target heating value back to the basic injection amount so that the actual heating value calculated by the actual heating value calculating means corresponds to the target heating value.

2. The control device for an internal combustion engine according to claim 1,
   wherein the actual heating value is a maximum value in a time period until an exhaust valve opens from start of combustion.

3. The control device for an internal combustion engine according to claim 1, further comprising: target excess air ratio setting means that sets a target excess air ratio based on an operation request; and
   correction means that corrects the target heating value based on the heating value ratio of a heating value in the predetermined excess air ratio, and a heating value in the target excess air ratio.

4. The control device for an internal combustion engine according to claim 1, further comprising:
   water temperature detecting means that detects a water temperature; and
   correction means that corrects the target heating value by decreasing the target heating value as the water temperature detected by the water temperature detecting means decreases.

5. The control device for an internal combustion engine according to claim 1, further comprising:
   target combustion point setting means that sets a target combustion point in which a combustion ratio becomes a predetermined ratio based on ignition timing; and
   correction means that corrects the target heating value based on a heating value ratio of a heating value in a combustion point (hereinafter described as an MBT combustion point) in which a combustion ratio at MBT becomes the predetermined ratio, and a heating value in the target combustion point.

6. The control device for an internal combustion engine according to claim 1, further comprising:
   alcohol concentration acquiring means that acquires an alcohol concentration in a fuel based on a fuel injection amount required to obtain the actual heating value calculated by the actual heating value calculating means, and the actual heating value; and
   correction means that corrects the target heating value by decreasing the target heating value as the alcohol concentration acquired by the alcohol concentration acquiring means increases.

7. The control device for an internal combustion engine according to claim 1, further comprising:
   EGR rate acquiring means that acquires an EGR rate; and
   correction means that corrects the target heating value by increasing the target heating value as the EGR rate acquired by the EGR rate acquiring means increases.

8. The control device for an internal combustion engine according to claim 1, further comprising:
   target combustion point setting means that sets a target combustion point in which a combustion ratio becomes a predetermined ratio based on ignition timing;
   actual combustion point calculating means that calculates an actual combustion point in which the combustion ratio in the ignition timing becomes the predetermined ratio; and
   actual heating value correcting means that corrects the actual heating value based on a difference of a heating value ratio of the target combustion point to an MBT combustion point, and a heating value ratio of the actual combustion point to an MBT combustion point.

9. A control device for an internal combustion engine which can be supplied with fuels of different alcohol concentrations, comprising:
   a cylinder internal pressure sensor that detects a cylinder internal pressure;
   cylinder internal fresh air amount calculating unit that calculates a cylinder internal fresh air amount based on a cylinder internal pressure detected by the cylinder internal pressure sensor in a compression stroke;
   actual heating value calculating unit that calculates an actual heating value based on the cylinder internal pressure detected by the cylinder internal pressure sensor after start of combustion;
   target heating value calculating unit that calculates a basic injection amount injected into the engine by a fuel injector in a predetermined excess air ratio and a target heating value in the predetermined excess air ratio from the cylinder internal fresh air amount calculated by the cylinder internal fresh air amount calculating unit, wherein a heating value ratio in the predetermined excess air ratio is determined without an air-fuel sensor; and feedback unit that feeds a correction amount corresponding to a comparison value of the actual heating value and the target heating value back to the basic injection amount so that the actual heating value calculated by the actual heating value calculating unit corresponds to the target heating value.

10. The control device for an internal combustion engine according to claim 9, wherein the actual heating value is a maximum value in a time period until an exhaust valve opens from start of combustion.

11. The control device for an internal combustion engine according to claim 9, further comprising;
   target excess air ratio setting unit that sets a target excess air ratio based on an operation request; and
   correction unit that corrects the target heating value based on the heating value ratio of a heating value in the predetermined excess air ratio, and a heating value in the target excess air ratio.

12. The control device for an internal combustion engine according to claim 9, further comprising:
   water temperature detecting unit that detects a water temperature; and
   correction unit that corrects the target heating value by decreasing the target heating value as the water temperature detected by the water temperature detecting unit decreases.

13. The control device for an internal combustion engine according to claim 9, further comprising:
   target combustion point setting unit that sets a target combustion point in which a combustion ratio becomes a predetermined ratio based on ignition timing; and
   correction unit that corrects the target heating value based on a heating value ratio of a heating value in a combustion point (hereinafter described as an MBT combustion point) in which a combustion ratio at MBT becomes the predetermined ratio, and a heating value in the target combustion point.

14. The control device for an internal combustion engine according to claim 9, further comprising: alcohol concentration acquiring unit that acquires an alcohol concentration in a fuel based on a fuel injection amount required to obtain the actual heating value calculated by the actual heating value calculating unit, and the actual heating value; and
   correction unit that corrects the target heating value by decreasing the target heating value as the alcohol concentration acquired by the alcohol concentration acquiring unit increases.

15. The control device for an internal combustion engine according to claim 9, further comprising:
   EGR rate acquiring unit that acquires an EGR rate; and
   correction unit that corrects the target heating value by increasing the target heating value as the EGR rate acquired by the EGR rate acquiring unit increases.

16. The control device for an internal combustion engine according to claim 9, further comprising:
   target combustion point setting unit that sets a target combustion point in which a combustion ratio becomes a predetermined ratio based on ignition timing;
   actual combustion point calculating unit that calculates an actual combustion point in which the combustion ratio in the ignition timing becomes the predetermined ratio; and
   actual heating value correcting unit that corrects the actual heating value based on a difference of a heating value ratio of the target combustion point to an MBT combustion point, and a heating value ratio of the actual combustion point to an MBT combustion point.

* * * * *